US012737002B2

(12) United States Patent
Bae et al.

(10) Patent No.: US 12,737,002 B2
(45) Date of Patent: Sep. 15, 2026

(54) DISPLAY DEVICE

(71) Applicant: LG ELECTRONICS INC., Seoul (KR)

(72) Inventors: Joonsub Bae, Seoul (KR); Chulki Kim, Seoul (KR); Jihyo Yoon, Seoul (KR); Jaehun Lee, Seoul (KR); Chanhan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 18/672,780

(22) Filed: May 23, 2024

(65) Prior Publication Data

US 2024/0310872 A1 Sep. 19, 2024

Related U.S. Application Data

(63) Continuation of application No. 17/763,312, filed as application No. PCT/KR2019/014470 on Oct. 30, 2019, now Pat. No. 12,019,469.

(30) Foreign Application Priority Data

Oct. 7, 2019 (KR) ........................ 10-2019-0123636

(51) Int. Cl.
*G06F 1/16* (2006.01)
*F16M 11/12* (2006.01)
*F16M 13/02* (2006.01)

(52) U.S. Cl.
CPC ......... *G06F 1/1607* (2013.01); *F16M 11/126* (2013.01); *F16M 13/02* (2013.01)

(58) Field of Classification Search
CPC ...... G06F 1/1601; G06F 1/1607; F16M 11/18
See application file for complete search history.

(56) References Cited

U.S. PATENT DOCUMENTS 7,097,143 B2 * 8/2006 Kim .................. F16M 11/2092 248/922
2004/0232298 A1 * 11/2004 Bremmon .............. F16M 13/02 248/397
2009/0101777 A1 * 4/2009 Kim ..................... F16M 11/126 248/220.21
2011/0116219 A1 * 5/2011 Delva .................... F16M 11/10 248/220.21

(Continued)

*Primary Examiner* — Anthony Q Edwards
(74) *Attorney, Agent, or Firm* — Birch, Stewart, Kolasch & Birch, LLP

(57) ABSTRACT

A display device according to the present invention including a display module including a display panel; at least one pair of first and second spacers disposed at the rear of the display module and fixed to the display module; and a wall mount assembly disposed at the rear of the back cover and fastened to the first and second spacers while allowing movements of the first and second spacers, wherein the wall mount assembly comprises: a fixing part fixed to a fixed object; a frame having a pair of first and second tilting holes into which the first and second spacers are respectively inserted, and which guides moving paths of the first and second spacers, and a locking part which selectively restricts the moving paths of the first and second spacers inserted into the first and second tilting holes; and a link connecting the fixing part and the frame to each other.

14 Claims, 21 Drawing Sheets

(56) References Cited

U.S. PATENT DOCUMENTS

2013/0168519 A1* 7/2013 In .......................... F16M 13/02
248/314
2018/0324961 A1* 11/2018 Han ........................ H05K 5/03
2022/0374042 A1* 11/2022 Bae ................... F16M 11/2014
2022/0403975 A1* 12/2022 Bae ..................... F16M 11/041

* cited by examiner (a)

(b)

DISPLAY DEVICE

CROSS REFERENCE TO RELATED APPLICATIONS

This application is a Continuation of application Ser. No. 17/763,312, filed on Mar. 24, 2022 (now U.S. Pat. No. 12,019,469 issued on Jun. 25, 2024), which is the National Phase of PCT International Application No. PCT/KR2019/014470, filed on Oct. 30, 2019, which claims priority under 35 U.S.C. 119(a) to Patent Application No. 10-2019-0123636, filed in Republic of Korea on Oct. 7, 2019, all of which are hereby expressly incorporated by reference into the present application.

BACKGROUND OF THE INVENTION

Field of the Invention

The present disclosure relates to a display device.

Description of the Related Art

With the development of information society, a demand for display devices increases in various forms, and thus research on various types of display devices such as a liquid crystal display (LCD) device, a plasma display panel (PDP), an electroluminescent display (ELD), and a vacuum fluorescent display (VFD) is in progress to meet the demand.

A display device may include a display module that displays an input image. The display module may be provided by combining a display panel and a case member for fixing the display panel.

The display module can be used by being hung on a fixed object such as a wall or by being supported on a stand and placed on a floor. In order to hang the display module on a fixed object, a wall mount assembly is required.

Recently, attempts have been made to implement a wall mount assembly as a multifunctional module that allows a display module to be adjusted in vertical and horizontal directions depending on user positions beyond a function of simply fixing the display module to a fixed object.

SUMMARY OF THE INVENTION

It is an object of the present disclosure to provide a display device including a wall mount assembly that allows a translational motion, a swivel motion, and a tilting motion of a display module.

Technical Solution

A display device according to an embodiment of the present disclosure includes: a display module including a display panel: at least one pair of first and second spacers disposed at the rear of the display module and fixed to the display module; and a wall mount assembly disposed at the rear of a back cover and fastened to the first and second spacers while allowing movements of the first and second spacers, wherein the wall mount assembly includes: a fixing part fixed to a fixed object; a frame having a pair of first and second tilting holes into which the first and second spacers are respectively inserted, and which guides moving paths of the first and second spacers, and a locking part for selectively restricting the moving paths of the first and second spacers inserted into the first and second tilting holes; and a link connecting the fixing part and the frame to each other.

Each of the first and second tilting holes may include an inlet portion provided to allow the first and second spacers to be inserted into and released from the inlet portion, and a guide portion disposed under the inlet portion, in which the first and second spacers inserted through the inlet portion is seated, and the locking part may include a blocking part rotatably fastened to the frame and disposed between the inlet portion and the guide portion.

Each of the first and second tilting holes may include a link portion connecting the inlet portion and the guide portion, and the blocking part may be disposed to correspond to the link portion.

One end and the other end of the locking part may be rotatably fastened to the frame.

Each of the first and second spacers may include a spacer head having a first diameter, and a spacer neck extending from the spacer head and having a second diameter less than the first diameter, the inlet portion may have a hole area greater than the first diameter, and the guide portion may have a hole area less than the first diameter and greater than the second diameter.

The guide portion may include a seating part, and first and second extension parts extending from the seating part in one direction, wherein the first and second extension parts extend in a reverse direction from the seating part.

An extension line extending in the extension direction of the guide portion and a horizontal line extending in a horizontal direction may intersect each other, and an angle formed by the extension line and the horizontal line may be a tilt angle.

The guide portions of the first and second tilting holes may extend in a straight line form in a tangent direction of a virtual arc passing through centers of the guide portions of the first and second tilting holes or extend in a curved form in an extension direction of the virtual arc.

The virtual arc may be convexly curved upward or convexly curved downward.

The virtual arc may be a part of the circumference of a circle having a virtual center point, wherein the virtual center point may be positioned on a reference line crossing the center of the frame in the vertical direction.

The first and second tilting holes may be symmetrical with respect to a reference line crossing the center of the frame in the vertical direction.

The display device may further include an auxiliary locking part fixed to the fixing part through one end and having predetermined elasticity, wherein the other end of the auxiliary locking part may extend downward from one end of the auxiliary locking part and may be disposed to overlap at least a part of the frame in a back-and-forth direction.

The display module may include a module cover disposed at the rear of the display panel, the back cover disposed at the rear of the module cover and having first and second open holes disposed to correspond to the first and second spacers, and a wall mount plate disposed between the module cover and the back cover and fixed to the module cover, wherein the first and second spacers may be fixed to the wall mount plate through the first and second open holes, respectively, at the rear of the back cover.

The back cover may include a forming part overlapping the wall mount plate, and at least a part of the wall mount assembly may be inserted into the forming part.

The link may include a first link and a second link rotatably coupled to each other based on a virtual first axis extending in the vertical direction, wherein one end of the first link may be rotatably coupled to the fixing part based on a virtual second axis extending in the vertical direction, and one end of the second link may be rotatably coupled to the frame based on a virtual third axis extending in the vertical direction.

The first link may include an accommodating recess capable of accommodating at least a part of the second link.

Advantageous Effects

The display device according to an embodiment of the present disclosure may include the wall mount assembly that allows a translational motion, a swivel motion, and a tilting motion of a display module. Accordingly, a user can change the position of the display module as necessary, and thus easiness to use the display device can be considerably improved.

The display device according to an embodiment of the present disclosure may include the tilting hole and the spacer for a tilting motion of the display module, and may further include the locking part for selectively restricting a moving path of the spacer inserted into the tilting hole. Accordingly, it is possible to prevent the spacer from being unintentionally separated from the tilting hole.

DETAILED DESCRIPTION OF THE INVENTION

Hereinafter, embodiments disclosed in the present specification will be described in detail with reference to the accompanying drawings, but the same or similar components are assigned the same reference numbers regardless of reference signs and redundant description thereof will be omitted.

The suffixes "module" and "part" for the components used in the following description are given or mixed in consideration of only the ease of writing the specification and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical spirit disclosed herein is not limited by the accompanying drawings and all changes included in the spirit and scope of the present invention should be understood to include equivalents or substitutes.

The display device according to the present disclosure may be implemented as a liquid crystal display (LCD), a field emission display (FED), a plasma display panel (PDP), and an organic light emitting diode display (OLED), an electrophoresis display device (EPD), a quantum dot display device (QDD), or the like. Hereinafter, a case in which the display device includes an OLED will be described as an example for convenience of description.

Figure 1:
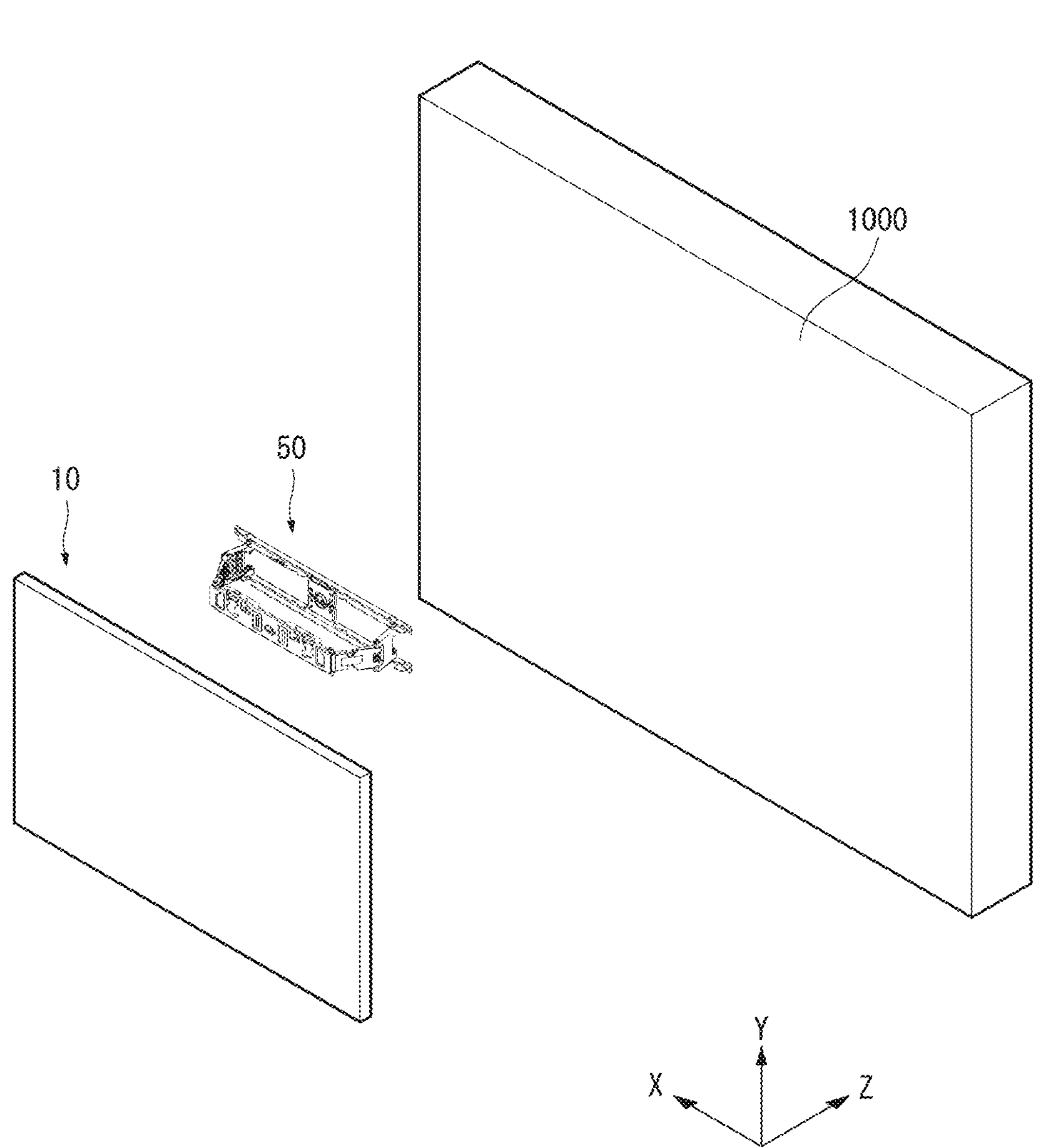
FIG. 1 is a perspective view schematically illustrating a display device according to an embodiment of the present disclosure.
Figure 2:
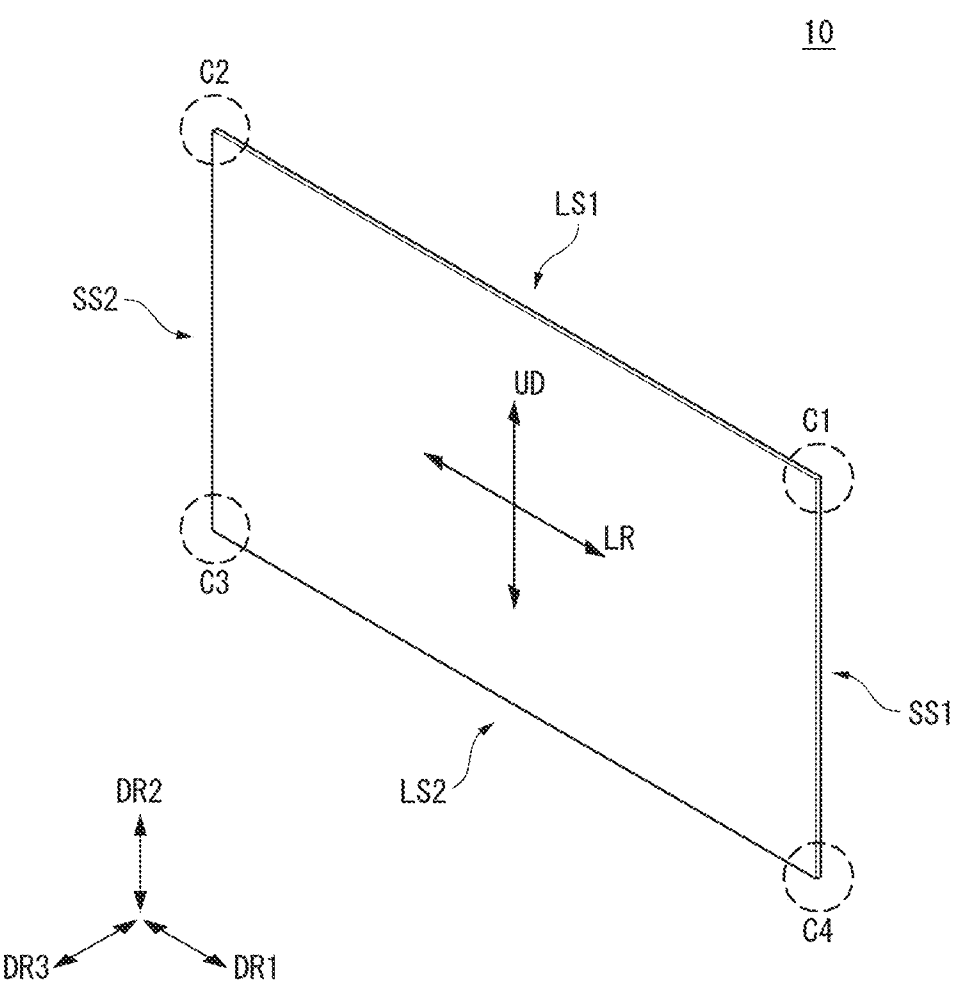
FIG. 2 is a perspective view schematically illustrating a display module according to an embodiment of the present disclosure.
Figure 3A:
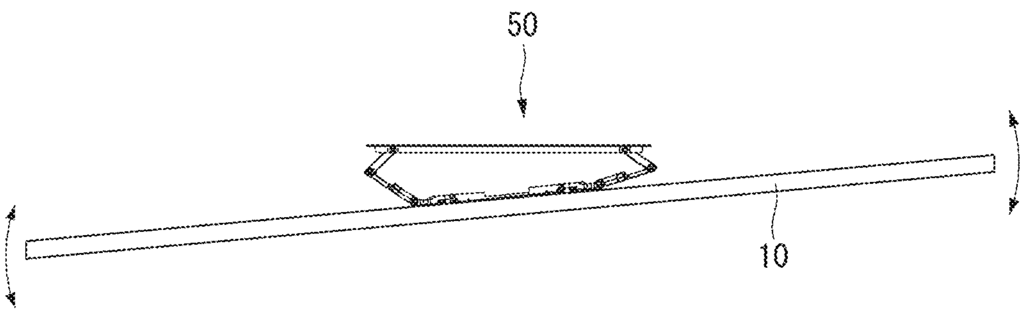
FIG. 3*a* to FIG. 3*c* are diagrams for describing an example of changing the position of the display module according to an embodiment of the present disclosure.
Figure 3B:
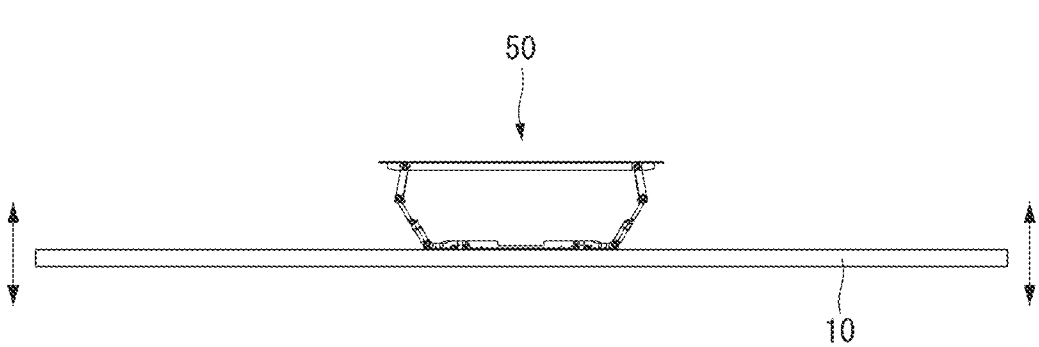
Figure 3C:
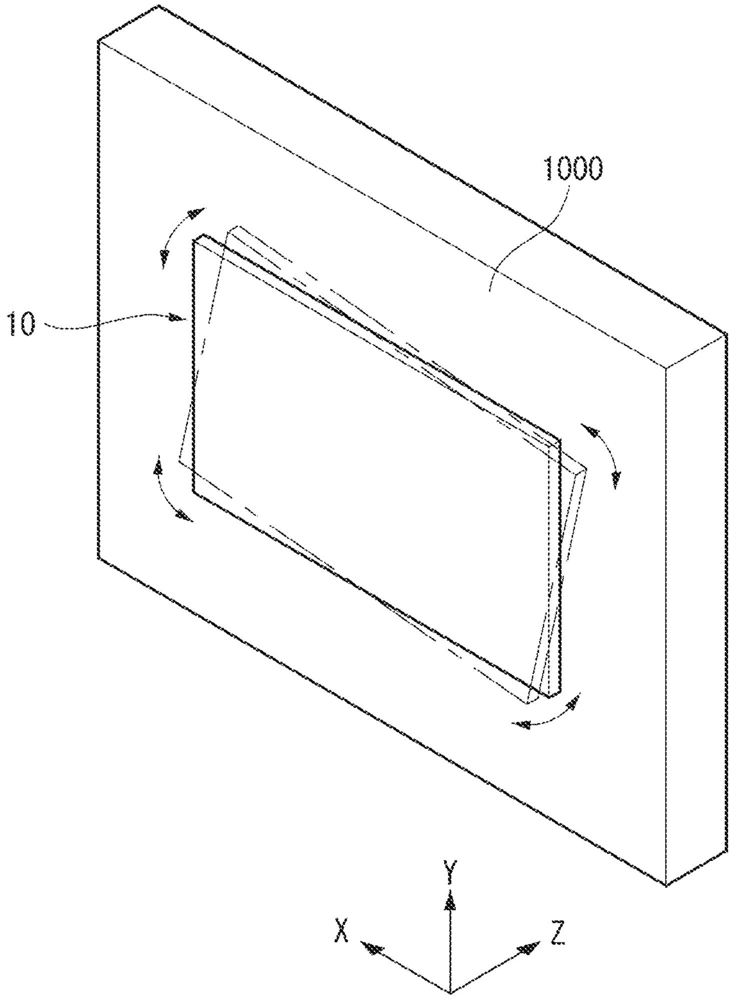
Figure 4:
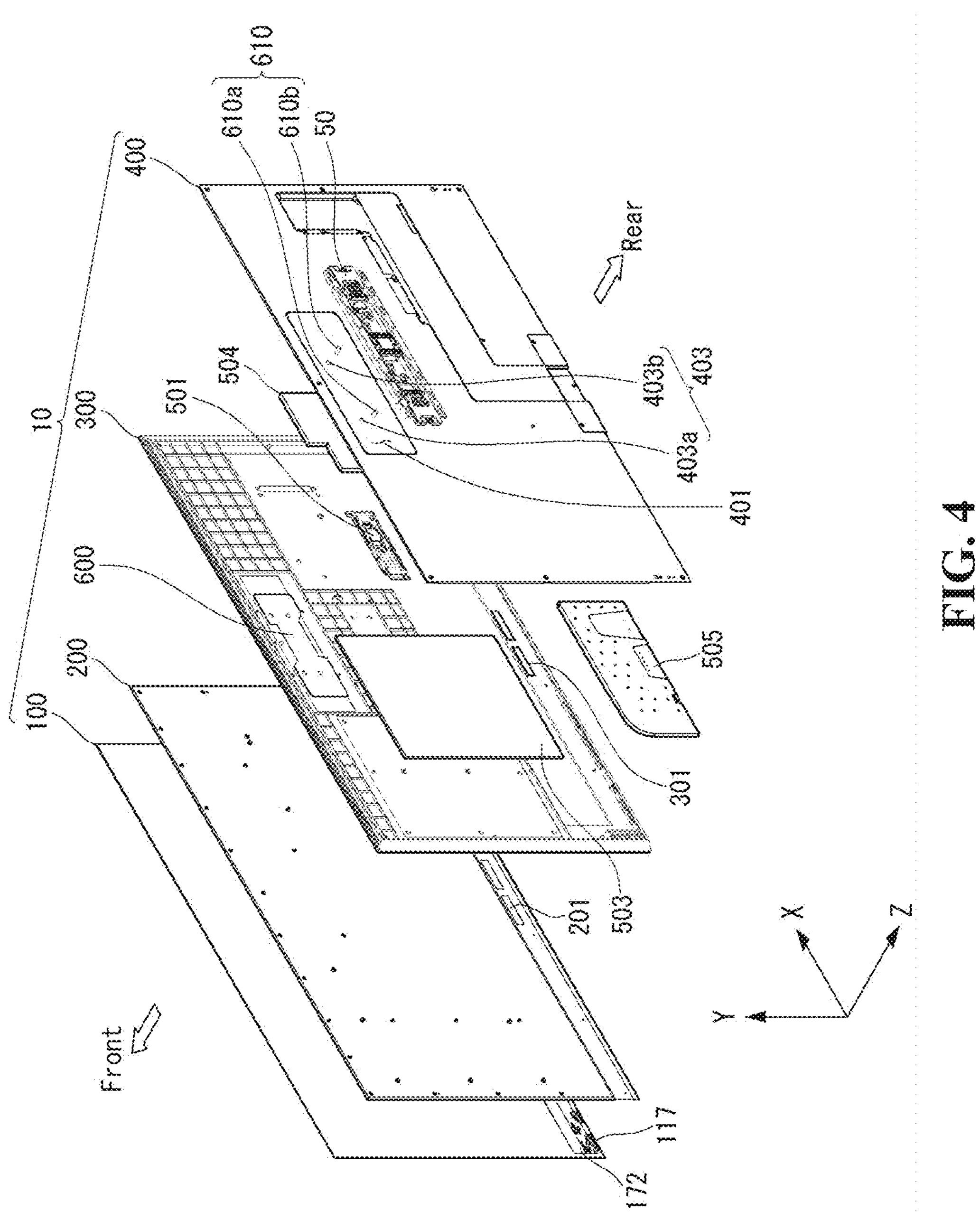
FIG. 4 is an exploded perspective view illustrating the display device according to an embodiment of the present disclosure.
Figure 5:
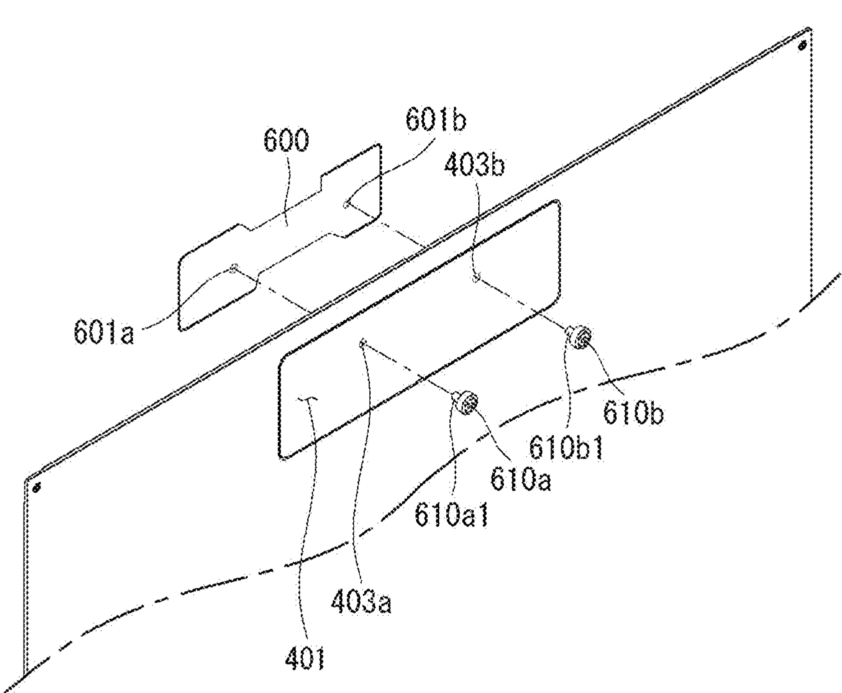
FIG. 5 is a diagram schematically illustrating a wall mount plate and a spacer.
Figure 6:
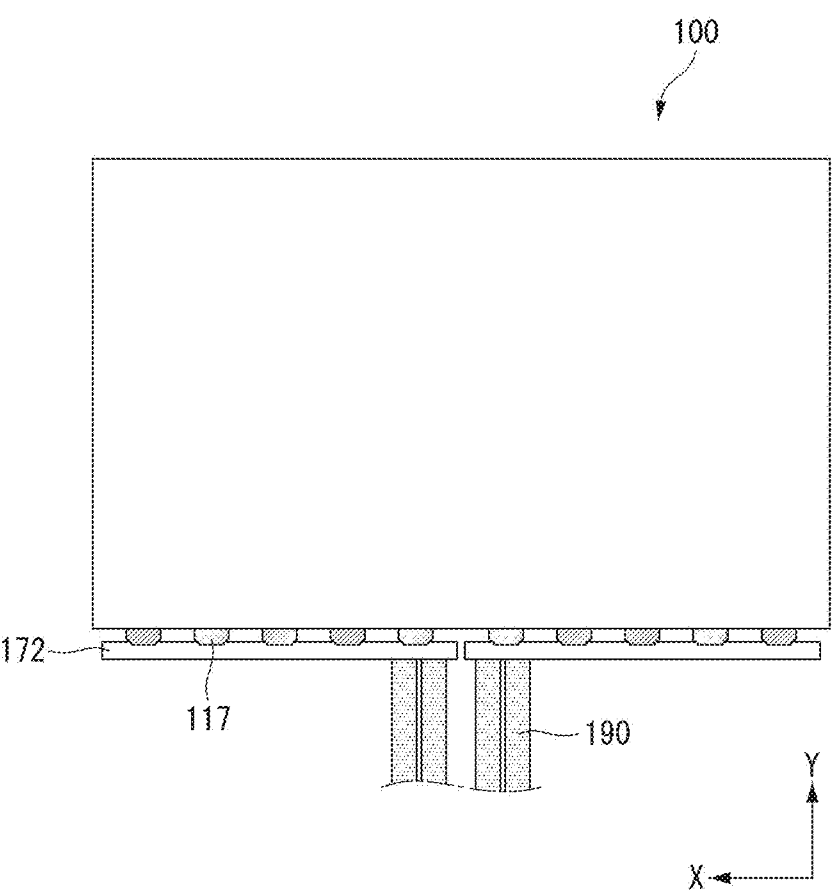
FIG. 6 and FIG. 7 are diagrams illustrating a rear surface of a display panel according to an embodiment of the present disclosure.
Figure 7:
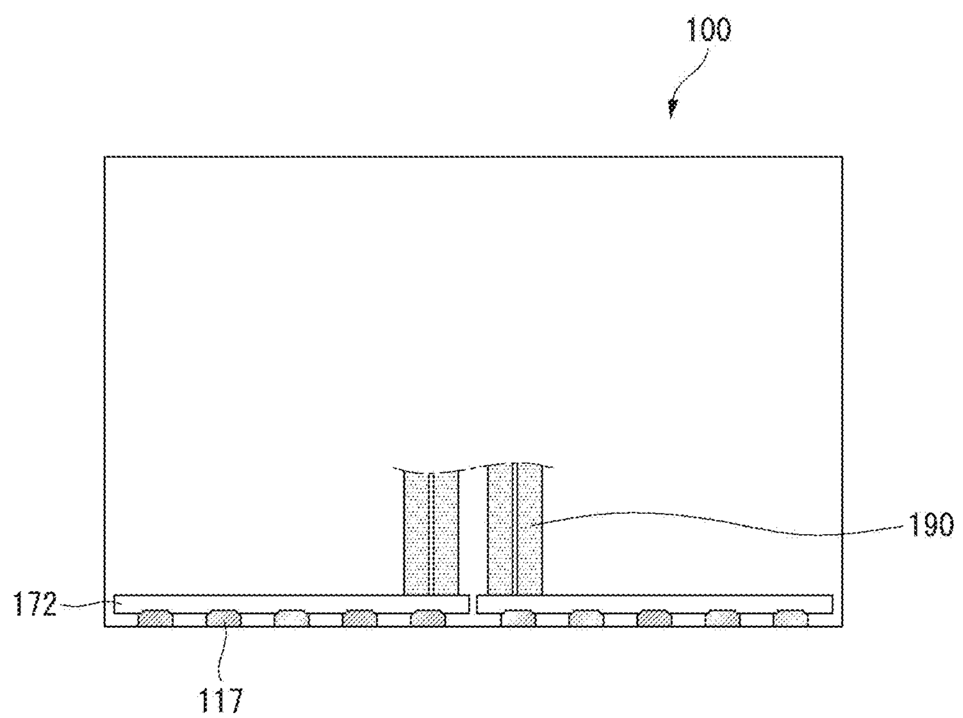

FIG. 1 is a perspective view schematically illustrating a display device according to an embodiment of the present disclosure. FIG. 2 is a perspective view schematically illustrating a display module according to an embodiment of the present disclosure. FIG. 3*a* to FIG. 3*c* are diagrams for describing an example of changing the position of the display module according to an embodiment of the present disclosure. FIG. 4 is an exploded perspective view illustrating the display device according to an embodiment of the present disclosure. FIG. 5 is a diagram schematically illustrating a wall mount plate and a spacer. FIG. 6 and FIG. 7 are diagrams illustrating a rear surface of a display panel according to an embodiment of the present disclosure.

Referring to FIG. 1 and FIG. 2, the display device may include a display module 10 and a wall mount assembly 50.

The display module 10 may include a display panel and a case member coupled to the display panel. The display module 10 may include a first long side LS1, a second long side LS2 opposite to the first long side LS1, a first short side SS1 adjacent to the first long side LS1 and the second long side LS2, and a second short side SS2 opposite to the first short side SS1.

Here, the first short side area SS1 may be referred to as a first side area, the second short side area SS2 may be referred to as a second side area opposite to the first side area, the first long side area LS1 may be referred to as a third side area adjacent to the first side area and the second side area and located between the first side area and the second side area, and the second long side area LS2 may be referred to as a fourth side area adjacent to the first side area and the second side area, located between the first side area and the second side area, and opposite to the third side area.

Although the first and second long sides LS1 and LS2 are illustrated and described as being longer than the first and second short sides SS1 and SS2 for convenience of description, the lengths of the first and second long sides LS1 and LS2 may be approximately equal to the lengths of the first and second short sides SS1 and SS2.

In addition, a first direction DR1 may be is a direction parallel to the long sides LS1 and LS2 of the display module 10, and a second direction DR2 may be a direction parallel to the short sides SS1 and SS2 of the display module 10.

The first direction DR1 may be parallel to a horizontal axis. The first direction DR1 may be referred to as a first horizontal axis. The second direction DR2 may be parallel to a vertical axis. The second direction DR2 may be referred to as a vertical axis. A third direction DR3 may be parallel to the horizontal axis. The third direction DR3 may be referred to as a second horizontal axis.

A side on which the display module 10 displays an image may be referred to as a front side or a front surface. When the display module 10 displays an image, a side from which the image cannot be observed may be referred to as a rear side or a rear surface. The third direction DR3 may be a back-and-forth direction.

When the display module 10 is viewed from the front side or the front surface, the side of the first long side LS1 may be referred to as an upper side or an upper surface. Similarly, the side of the second long side LS2 may be referred to as a lower side or a lower surface. Similarly, the side of the first short side SS1 may be referred to as a right or a right side, and the side of the second short side SS2 may be referred to as a left or a left side.

A lateral side of the display module 10 may mean at least one of the upper surface, the lower surface, the right side, and the left side of the display module 10.

In addition, the first long side LS1, the second long side LS2, the first short side SS1, and the second short side SS2 may be referred to as edges of the display module 10. Further, points where the first long side LS1, the second long side LS2, the first short side SS1, and the second short side SS2 meet may be referred to as corners. For example, the point where the first long side LS1 and the first short side SS1 meet may be a first corner C1, the point where the first long side LS1 and the second short side SS2 meet may be a second corner C2, the point where the second short side SS2 and the second long side LS2 meet may be a third corner C3, and the point where the second long side LS2 and the first short side SS1 meet may be a fourth corner C4.

Here, a direction from the first short side SS1 to the second short side SS1 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

The wall mount assembly 50 may be fixed to a fixed object 1000 such as a wall. That is, the wall mount assembly 50 may be fixed to an arbitrary predetermined position such as a wall such that the movement thereof can be restricted. The wall mount assembly 50 may be fixed to an attachment surface of the fixed object 1000 through a fixing member such as a screw. The attachment surface may refer to one surface of the fixed object 1000 to which the wall mount assembly 50 is fixed.

The wall mount assembly 50 may fix the display module 10 to the fixed object 1000. In addition, the wall mount assembly 50 may serve to change the position of the display module 10 in response to the position of a user according to user demand. That is, the wall mount assembly 50 may fix the display module 10 to the fixed object 1000 such that the position of the display module 10 can be changed within a preset range.

The movement of the display module 10 and the wall mount assembly 50 may be caused by a physical external force directly provided by a user. For example, when the user applies a force to the display module 10 after gripping the display module 10, the position of the display module 10 may be changed within a range allowed by the wall mount assembly 50. Alternatively, the movement of the wall mount assembly 50 may be controlled through a control unit in response to a predetermined specific signal. That is, a state change of the wall mount assembly 50 may be controlled by a selected driving device, driving circuit, and the like.

As shown in FIG. 3*a*, the wall mount assembly 50 may allow translational motion of the display module 10. The wall mount assembly 50 may separate the display module 10 forward by a predetermined distance from the fixed object 1000 or may allow the display module 10 to come close to or contact the fixed object 1000. That is, the wall mount assembly 50 may allow the display module 10 to be moved forward and backward within a preset range.

As shown in FIG. 3*b*, the wall mount assembly 50 may allow a swivel motion of the display module 10. In a state in which movement of one side of the display module 10 is restricted, the wall mount assembly 50 may allow the other side of the display module 10 to move. For example, the wall mount assembly 50 may allow the right side of the display module 10 to move forward or backward while movement of the left side of the display module 10 is limited to a preset position.

As shown in FIG. 3*c*, the wall mount assembly 50 may allow a tilting motion of the display module 10. The wall mount assembly 50 may move at least one side of the display module 10 up and down in an initial state (or a reference state) such that the display module 10 tilts in one direction from the initial state.

Referring to FIG. 4 and FIG. 5, the display device may include the display module 10 and the wall mount assembly 50. The display module 10 may include a display panel and a case member.

The display panel 100 is provided on the front side of the display device and can display images. The display panel 100 may output an image by dividing the image into a plurality of pixels and matching color, brightness, and saturation for each pixel. The display panel 100 may be divided into an active area in which an image is displayed and an inactive area in which an image is not displayed.

The display panel 100 may include an organic display panel (OLED panel). The display panel 100 can spontaneously emit light. The display panel 100 may be very thin.

The case member may include an inner plate 200, a module cover 300, a back cover 400, and a wall mount plate 600.

The inner plate 200 may be located at the rear of the display panel 100. The inner plate 200 may be attached to the rear surface of the display panel 100. The inner plate 200 may be coupled to the rear surface of the display panel 100 through one or more adhesive members.

The inner plate 200 may provide rigidity to the display panel 100. The inner plate 200 may receive heat from the display panel 100 and emit the heat. The inner plate 200 may have high heat conductivity. The inner plate 200 may include a metal. The inner plate 200 may include aluminum or an aluminum alloy.

The module cover 300 may be located at the rear of the inner plate 200. The module cover 300 may form an inner space in the front thereof. The display panel 100 and the inner plate 200 may be accommodated in the inner space provided in front of the module cover 300. The module cover 300 may cover at least parts of the sides of the inner plate 200 and the display panel 100. The inner space provided in front of the module cover 300 may be referred to as a front accommodating part.

The module cover 300 may form an inner space at the rear thereof. Electronic components may be accommodated in the inner space provided at the rear of the module cover 300. The electronic components may include a timing controller board 501, a power supply 503, a main board 504, a speaker 505, and the like. The electronic components may be fixed to the rear of the module cover 300. The inner space provided at the rear of the module cover 300 may be referred to as a rear accommodating part. The electronic components may be seated in the rear accommodating part. The rear accommodating part may be divided into a plurality of parts to provide a plurality of spaces, the electronic components may be respectively accommodated in the divided spaces.

The module cover 300 may be made of a polymer material. The module cover 300 may be formed of a plastic material. That is, the module cover 300 may be formed of a plastic-based material that can be molded. The module cover 300 may be formed of polycarbonate but is not limited thereto.

The module cover 300 and the inner plate 200 may be fixed to each other through at least one fixing member. The fixing member may be a screw but is not limited thereto.

The back cover 400 may be located at the rear of the module cover 300. The back cover 400 may cover at least a part of the rear surface of the module cover 300. The back cover 400 may be positioned to cover the rear accommodating part of the module cover 300. The back cover 400 may protect the electronic components accommodated in the rear accommodating part of the module cover 300.

The back cover 400 may be made of a material different from that of the module cover 300. For example, the back cover 400 may include a metal material. The back cover 400 may be formed through processing through a press process. The back cover 400 and the module cover 300 may be fixed to each other through at least one fixing member. The fixing member may be a screw. Preferably, the fixing member may be a latch. As the back cover 400 and the module cover 300 are fastened using a plurality of latches, they may be free from space constraints with respect to surrounding members or parts. Accordingly, a degree of freedom in design can be improved.

The rear surface of the back cover 400 may include a forming part 401. The forming part 401 may have a shape that is recessed toward the front from the rear surface of the back cover 400. The forming part 401 may be a part into which at least a part of the wall mount assembly 50 is inserted. By providing the forming part 401 capable of accommodating the wall mount assembly 50, a level of recognition of the wall mount assembly 50 can be minimized when the wall mount assembly 50 is not used.

The wall mount plate 600 may be positioned between the module cover 300 and the back cover 400. The wall mount plate 600 may be fixed to the module cover 300. The wall mount plate 600 may be fixed to the upper central portion of the module cover 300. The wall mount plate 600 may be positioned to overlap the forming part 401.

The wall mount plate 600 may be a part to which the spacer 610 is fixed. Although not shown, a wall mount bracket for reinforcing the rigidity of the wall mount plate 600 may be further provided. However, in order to realize a slim display device, it may be desirable that the wall mount bracket be omitted.

The spacer 610 may include at least a pair of a first spacer **610*a* and a second spacer 610*b*. The first spacer 610*a* and the second spacer 610*b* may be positioned at the rear of the back cover 400. The first spacer 610*a* and the second spacer 610*b* may be positioned at symmetrical positions with respect to a virtual axis crossing the center of the wall mount plate 600 in the vertical direction. In other words, the first spacer 610*a* and the second spacer 610*b* may be respectively located at symmetrical positions with respect to a virtual axis crossing the center of the display module 10** in the vertical direction.

The first spacer **610*a* and the second spacer 610*b* may be fixed to the wall mount plate 600 through a first open hole 403*a* and a second open hole 403*b* that penetrate the back cover 400, respectively. For example, a first nut 601*a* and a second nut 601*b* may be fixed to the wall mount plate 600, and a first bolt 610*a*1 and a second bolt 601*b*1 may be respectively fixed to the first spacer 610*a* and the second spacer 610*b*. The first bolt 610*a*1 may penetrate the first open hole 403*a* and be fixed to the first nut 601*a*, and the second bolt 610*b*1 may penetrate the second open hole 403*b* and be fixed to the second nut 601*b***.

The wall mount assembly 50 may be located at the rear of the back cover 400. The wall mount assembly 50 may be movably fastened to at least a pair of the first spacer **610*a* and the second spacer 610*b*. The specific configuration of the wall mount assembly 50** will be described later.

Referring to FIG. 6, a member layer 117 may extend from one side of the display panel 100. For example, the member layer 117 may have a shape extending from the second long side LS2 of the display panel 100. A plurality of member layers 117 may be provided. The member layer 117 may be electrically connected to the display panel 100. The member layer 117 may include at least one of a chip-on-film (COF), a chip-on-glass (COG), a flexible printed circuit board (FPCB), and a tape carrier package (TCP).

A source PCB 172 may have a shape extending from the member layer 117. The source PCB 172 may be electrically connected to the member layer 117. A plurality of source PCBs 172 may be provided.

A cable 190 may have a shape extending from the source PCB 172. The cable 190 may be electrically connected to the source PCB 172. A plurality of cables 190 may be provided.

Power and/or signals provided to the cable 190 may be delivered to the source PCB 172. Power and/or signals provided to the source PCB 172 may be distributed to the member layer 117. Power and/or signals distributed to the member layer 117 may be supplied to the display panel 110.

Referring to FIG. 7 along with FIG. 6, the member layer 117 may be flexible. The member layer 117 may be bent toward the rear surface of the display panel 100. The member layer 117 may be positioned at the rear of the display panel 100. The source PCB 172 connected to the member layer 117 may be located at the rear of the display panel 100. The cable 190 connected to the source PCB 172 may be located at the rear of the display panel 100.

The inner plate 200 may include a first slot 201. The first slot 201 may be formed penetrating the inner plate 200. The first slot 201 may be formed adjacent to the lower surface of the inner plate 200. The number of first slots 201 may correspond to the number of cables 190, and the cables 190 may extend toward the rear of the inner plate 200 through the first slots 201 corresponding thereto. However, the present disclosure is not limited thereto, and a plurality of cables 190 may penetrate one first slot 201.

The module cover 300 may include a second slot 301. The second slot 301 may be formed penetrating the module cover 300. The second slot 301 may be formed adjacent to the lower surface of the module cover 300. The number of second slots 301 may be the same as the number of cables 190, and the cables 190 may extend toward the rear of the module cover 300 through the second slots 301 corresponding thereto. However, the present invention is not limited thereto, and a plurality of cables 190 may penetrate one second slot 301. The second slots 301 may overlap the first slots 201. The number of second slots 301 may be the same as the number of first slots 201.

As described above, the cables 190 may penetrate the first slots 201 and the second slots 301 to be electrically connected to electronic components positioned at the rear of the module cover 300. For example, the cables 190 may be electrically connected to the timing controller board 501 to receive power and/or signals.

Figure 8:
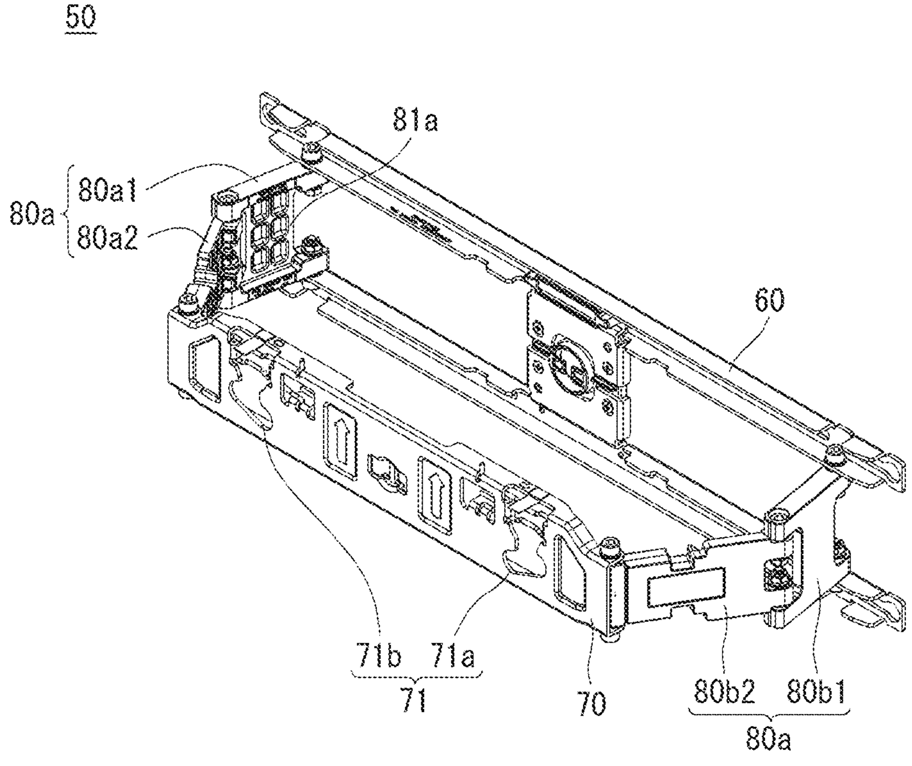
FIG. 8 and FIG. 9 are perspective views illustrating a wall mount assembly according to an embodiment of the present disclosure.
Figure 9:
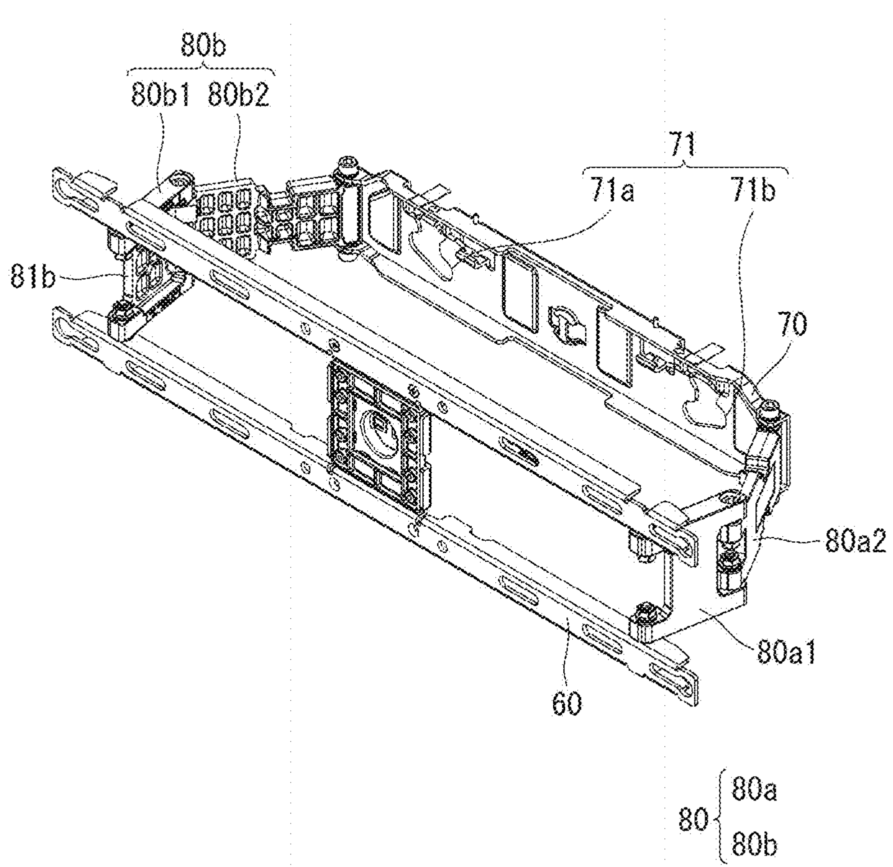
Figure 10:
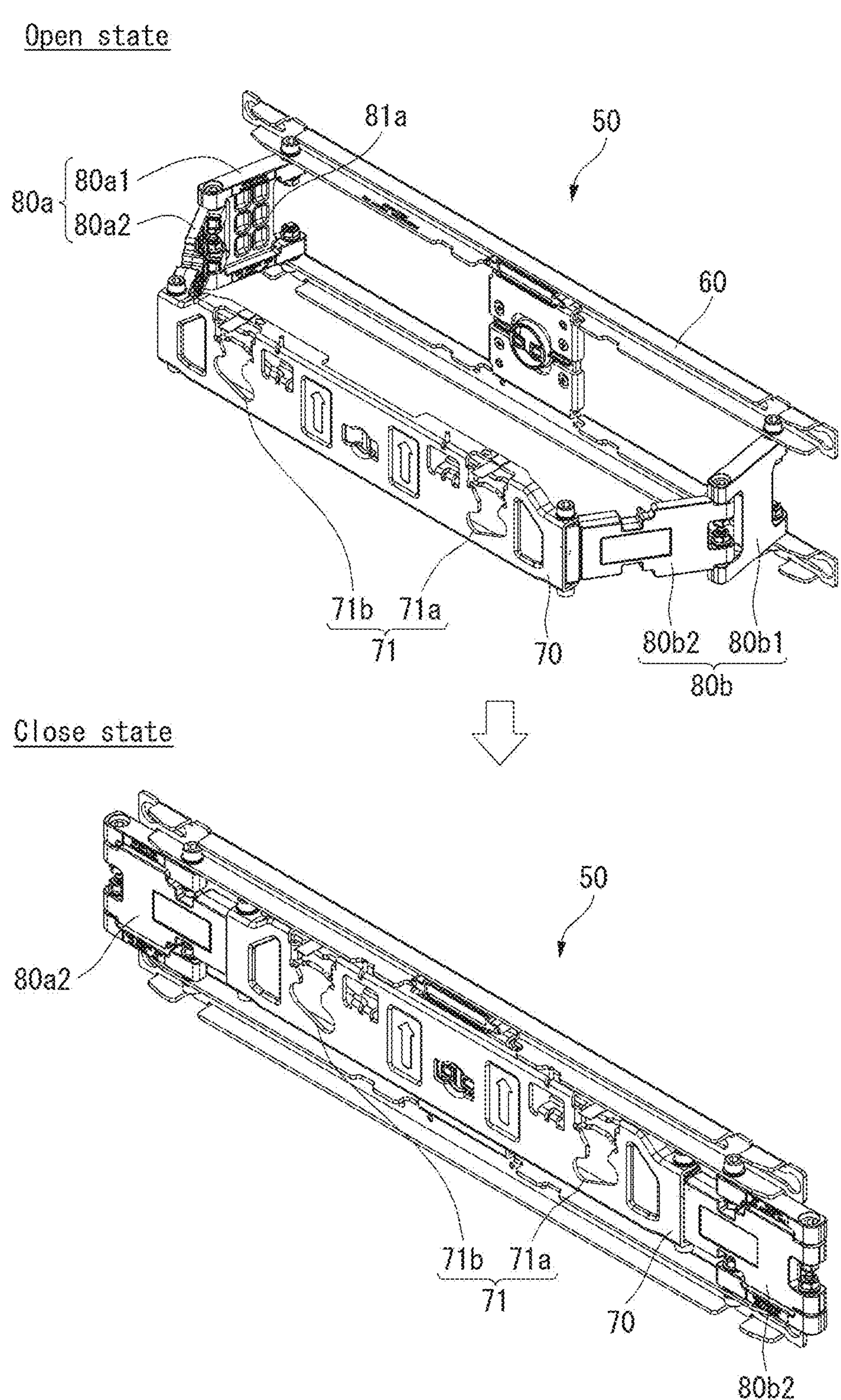
FIG. 10 is a diagram for describing an operating state (folded state or unfolded state) of a link according to an embodiment of the present disclosure.

FIG. 8 and FIG. 9 are perspective views showing a wall mount assembly according to an embodiment of the present disclosure. FIG. 10 is a diagram for describing an operating state (a folded state or an unfolded state) of a link according to an embodiment of the present disclosure.

Referring to FIG. 8 to FIG. 10, the wall mount assembly 50 according to an embodiment of the present disclosure includes a fixing part 60, a frame 70, and a link 80 that connects the fixing part 60 and the frame 70.

The fixing part 60 may be a part fixed to the fixed object 1000 such as a wall. That is, the fixing part 60 may be fixed to an arbitrary predetermined position such as a wall such that the movement thereof can be restricted. The wall mount assembly 50 may be fixed to the attachment surface of the fixed object 1000 through a fixing member such as a screw. The fixing part 60 may have a shape of a plurality of bars extending in one direction, and adjacent bars may be spaced apart from each other by a predetermined distance. However, the present disclosure is not limited thereto.

The frame 70 may be a part fastened to the spacer 610 fixed to the display module 10. The frame 70 may be in contact with the rear surface of the display module 10. The frame 70 may be provided to have a plate shape having a preset area and may support the display module 10 behind the display module 10. A detailed configuration of the frame 70 will be described later.

The link 80 may include a first link part **80*a* connecting one end of the fixing part 60 and one end of the frame 70, and a second line part 80*b* connecting the other end of the fixing part 60 and the other end of the frame 70**.

The first link part **80*a* may include a (1-1)-th link 80*a*1 and a (1-2)-th link 80*a*2**.

The (1-1)-th link **80*a*1 and the (1-2)-th link 80*a*2 may be hinge-coupled. That is, one end of the (1-1)-th link 80*a*1 and one end of the (1-2)-th link 80*a*2 may be rotatably coupled to each other. For example, one end of the (1-1)-th link 80*a*1 and one end of the (1-2)-th link 80*a*2 may be provided in a shape to match each other in male and female forms and may be coupled to each other. Here, the (1-1)-th link 80*a*1 and the (1-2)-th link 80*a*2 may be rotatably provided with respect to each other based on a virtual axis extending in the vertical direction, and one surface of the (1-1)-th link 80*a*1 and one surface of the (1-2)-th link 80*a*2 may be located in contact with each other (e.g., in a folded state) or spaced apart from each other at a predetermined angle (e.g., in an unfolded state) in response to rotation. A friction member for providing a predetermined frictional force during rotation may be provided between fixing structures of one end of the (1-1)-th link 80*a*1 and one end of the (1-2)-th link 80*a*2. Due to the friction member, the (1-1)-th link 80*a*1 and the (1-2)-th link 80*a*2** do not rotate with respect to each other and may maintain a previous state as long as the user does not provide a force greater than or equal to a preset level.

A first accommodating recess **81*a* in which the (1-2)-th link 80*a*2 can be accommodated may be provided on one surface of the (1-1)-th link 80*a*1. At least a part of the (1-2)-th link 80*a*2 may be accommodated in the first accommodating recess 81*a* of the (1-1)-th link 80*a*1. Accordingly, the overall thickness of the wall mount assembly 50 can be reduced in a state in which the (1-1)-th link 80*a*1 and the (1-2)-th link 80*a*2** are folded.

The (1-1)-th link **80*a*1 may be hinge-connected to one end of the fixing part 60. That is, the other end of the (1-1)-th link 80*a*1 may be rotatably coupled to one end of the fixing part 60. For example, the other end of the (1-1)-th link 80*a*1 and one end of the fixing part 60 may be provided in a shape to match each other in male and female forms and may be coupled to each other. Here, the (1-1)-th link 80*a*1 may be rotatably provided with respect to the fixing part 60 based on a virtual axis extending in the vertical direction and may be positioned in parallel to the fixing part 60 or may be positioned to have a predetermined angle with respect to the fixing part 60 in response to rotation. A friction member for providing a predetermined frictional force during rotation may be provided between fixing structures of the other end of the (1-1)-th link 80*a*1 and one end of the fixing part 60. Due to the friction member, the (1-1)-th link 80*a*1 may maintain the previous state thereof without rotating with respect to the fixing part 60** as long as the user does not provide a force equal to or greater than a preset level.

The (1-2)-th link **80*a*2 may be hinge-connected to one end of the frame 70. That is, the other end of the (1-2)-th link 80*a*2 may be rotatably coupled to one end of the frame 70. For example, the other end of the (1-2)-th link 80*a*2 and one end of the frame 70 may be provided in a shape to match each other in male and female forms and may be coupled to each other. Here, the (1-2)-th link 80*a*2 may be rotatably provided with respect to the frame 70 based on a virtual axis extending in the vertical direction and may be positioned in parallel to the frame 70 or may be positioned to have a predetermined angle with respect to the frame 70 in response to rotation. A friction member for providing a predetermined frictional force during rotation may be provided between fixing structures of the other end of the (1-2)-th link 80*a*2 and one end of the frame 70. Due to the friction member, the (1-2)-th link 80*a*2 may maintain the previous state thereof without rotating with respect to the frame 70** as long as the user does not provide a force equal to or greater than a preset level.

The second link part **80*b* may include a (2-1)-th link 80*b*1 and a (2-2)-th link 80*b*2**.

The (2-1)-th link **80*b*1 and the (2-2)-th link 80*b*2 may be hinge-coupled. That is, one end of the (2-1)-th link 80*b*1 and one end of the (2-2)-th link 80*b*2 may be rotatably coupled to each other. For example, one end of the (2-1)-th link 80*b*1 and one end of the (2-2)-th link 80*b*2 may be provided in a shape to match each other in male and female forms and may be coupled to each other. Here, the (2-1)-th link 80*b*1 and the (2-2)-th link 80*b*2 may be rotatably provided with respect to each other based on a virtual axis extending in the vertical direction, and one surface of the (2-1)-th link 80*b*1 and one surface of the (2-2)-th link 80*b*2 may be located in contact with each other (e.g., in a folded state) or spaced apart from each other at a predetermined angle (e.g., in an unfolded state) in response to rotation. A friction member for providing a predetermined frictional force during rotation may be provided between fixing structures of one end of the (2-1)-th link 80*b*1 and one end of the (2-2)-th link 80*b*2. Due to the friction member, the (2-1)-th link 80*b*1 and the (2-2)-th link 80*b*2** do not rotate with respect to each other and may maintain a previous state as long as the user does not provide a force equal to or greater than a preset level.

A second accommodating recess **81*b* in which the (2-2)-th link 80*b*2 can be accommodated may be provided on one surface of the (2-1)-th link 80*b*1. At least a part of the (2-2)-th link 80*b*2 may be accommodated in the second accommodating recess 81*b* of the (2-1)-th link 80*b*1. Accordingly, the overall thickness of the wall mount assembly 50 can be reduced in a state in which the (2-1)-th link 80*b*1 and the (2-2)-th link 80*b*2** are folded.

The (2-1)-th link **80*b*1 may be hinge-connected to the other end of the fixing part 60. That is, the other end of the (2-1)-th link 80*b*1 may be rotatably coupled to one end of the fixing part 60. For example, the other end of the (2-1)-th link 80*b*1 and the other end of the fixing part 60 may be provided in a shape to match each other in male and female forms and may be coupled to each other. Here, the (2-1)-th link 80*b*1 may be rotatably provided with respect to the fixing part 60 based on a virtual axis extending in the vertical direction and may be positioned in parallel to the fixing part 60 or may be positioned to have a predetermined angle with respect to the fixing part 60 in response to rotation. A friction member for providing a predetermined frictional force during rotation may be provided between fixing structures of the other end of the (2-1)-th link 80*b*1 and the other end of the fixing part 60. Due to the friction member, the (2-1)-th link 80*b*1 may maintain the previous state thereof without rotating with respect to the fixing part 60** as long as the user does not provide a force equal to or greater than a preset level.

The (2-2)-th link **80*b*2 may be hinge-connected to the other end of the frame 70. That is, the other end of the (2-2)-th link 80*b*2 may be rotatably coupled to the other end of the frame 70. For example, the other end of the (2-2)-th link 80*b*2 and the other end of the frame 70 may be provided in a shape to match each other in male and female forms and may be coupled to each other. Here, the (2-2)-th link 80*b*2 may be rotatably provided with respect to the frame 70 based on a virtual axis extending in the vertical direction and may be positioned in parallel to the frame 70 or may be positioned to have a predetermined angle with respect to the frame 70 in response to rotation. A friction member for providing a predetermined frictional force during rotation may be provided between fixing structures of the other end of the (2-2)-th link 80*b*2 and the other end of the frame 70. Due to the friction member, the (2-2)-th link 80*b*2 may maintain the previous state thereof without rotating with respect to the frame 70** as long as the user does not provide a force equal to or greater than a preset level.

In this manner, the frame 70 fixed to the display module 10 can allow the translational motion and swivel motion of the display module 10 as described above according to the structures of the first link part **80*a* and the second link part 80*b***.

Figure 11:
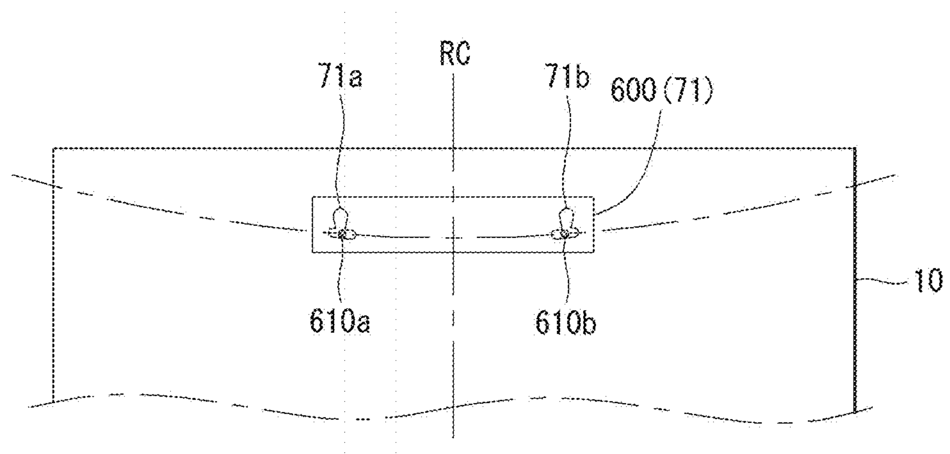
FIG. 11 is a diagram for describing a structure of a frame and the relationship between the frame and the spacer according to an embodiment of the present disclosure.

FIG. 11 is a diagram for describing the structure of the frame and the relationship between the frame and the spacer according to an embodiment of the present disclosure.

Referring to FIG. 11, the display device according to an embodiment of the present disclosure may include spacers 610 and tilting holes 71 provided to allow a tilting motion of the display module 10.

The display module 10 may include at least a pair of a first spacer **610*a* and a second spacer 610*b*. The first spacer 610*a* and the second spacer 610*b* are positioned at the rear of the display module 10 and may be disposed at an upper central portion. The first spacer 610*a* and the second spacer 610*b* may be respectively positioned on one side and the other side to be symmetrical with respect to a virtual axis crossing the center of the display module 10** in the vertical direction.

The frame 70 of the wall mount assembly 50 may include at least a pair of a first tilting hole **71*a* and a second tilting hole 71*b*. The first tilting hole 71*a* may be formed at a position corresponding to the first spacer 610*a* in the frame 70 and the second tilting hole 71*b* may be formed at a position corresponding to the second space 610*b* in the frame 70. The first tilting hole 71*a* and the second tilting hole 71*b* may be respectively located on one side and the other side to be symmetrical with respect to a virtual axis crossing the center of the frame part 70** in the vertical direction.

The first spacer **610*a* and the second spacer 610*b* fixed to the display module 10 may be fastened to the first tilting hole 71*a* and the second tilting hole 71*b*, respectively. The first tilting hole 71*a* and the second tilting hole 71*b* may restrict movement of the first spacer 610*a* and the second spacer 610*b* fixed to the display module 10. This means that movement of the display module 10 in at least one direction may be restricted in response to the shape of the tilting hole 71. In addition, the first tilting hole 71*a* and the second tilting hole 71*b* may guide moving paths of the first spacer 610*a* and the second spacer 610*b* fixed to the display module 10. This means that the display module 10 may be tilted or shifted in a preset direction in response to the shape of the tilting hole 71**.

Figure 12:
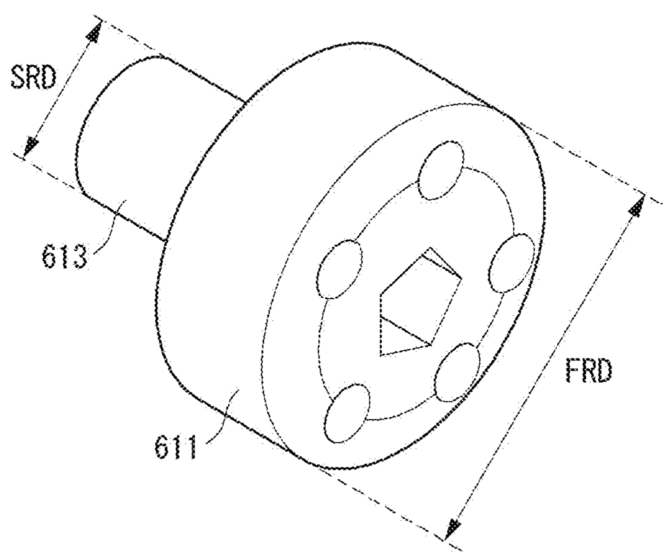
FIG. 12 is a view for describing a shape of the spacer according to an embodiment of the present disclosure.
Figure 13:
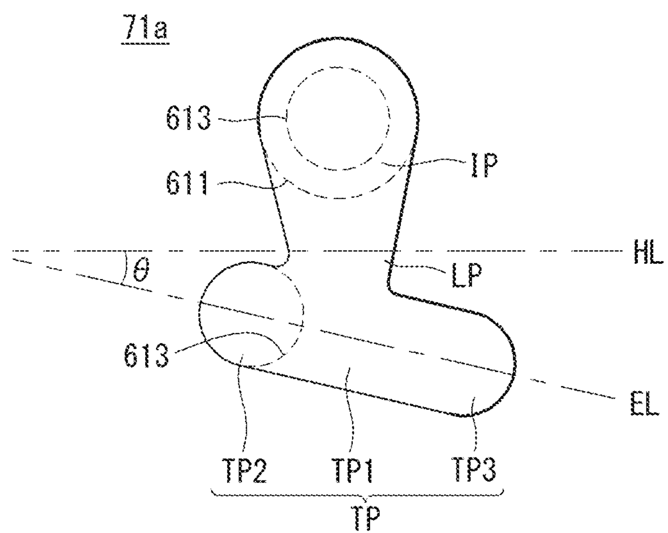
FIG. 13 to FIG. 15 are views for describing structures of the spacer and a tilting hole according to an embodiment of the present disclosure.
Figure 14:
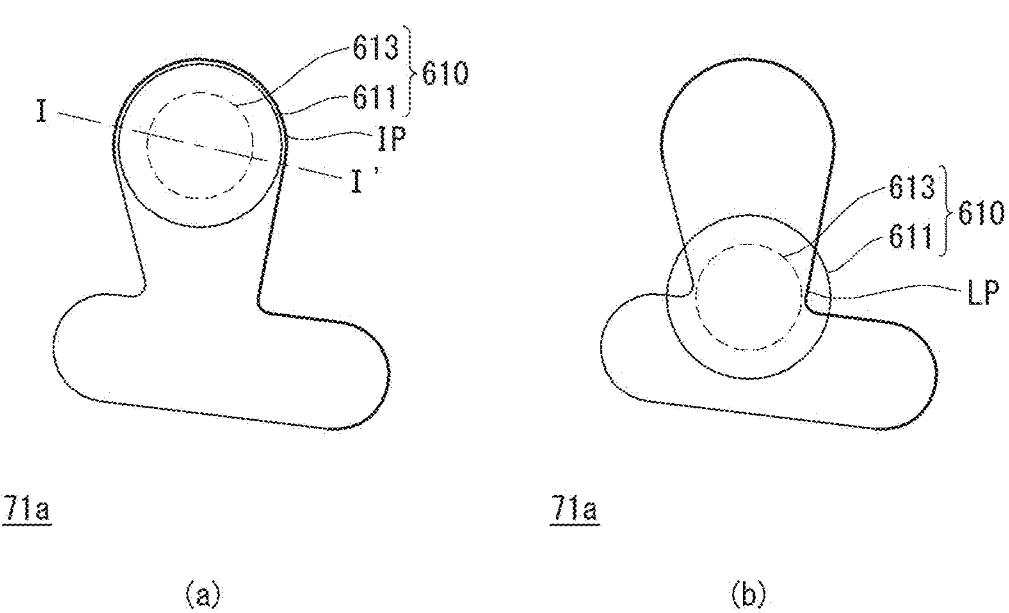
Figure 14:
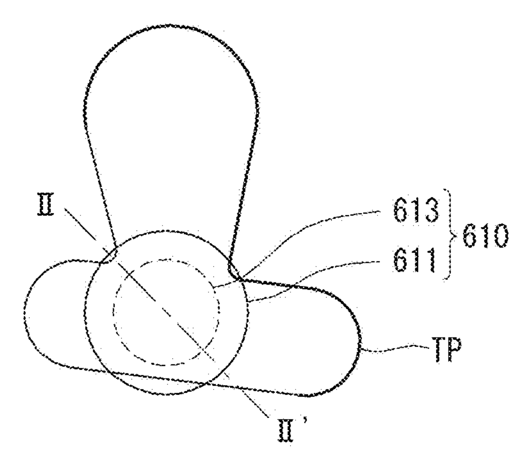
Figure 15:
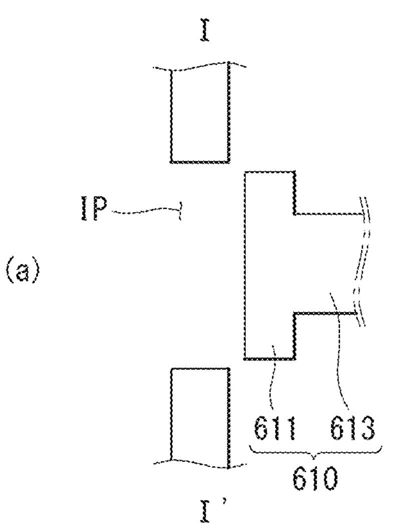
Figure 15:
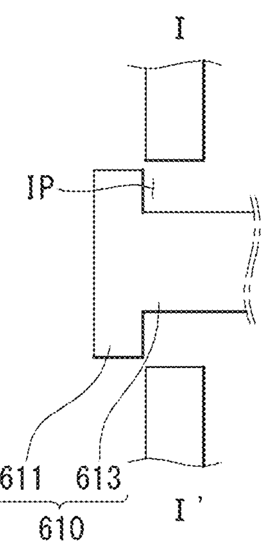
Figure 15:
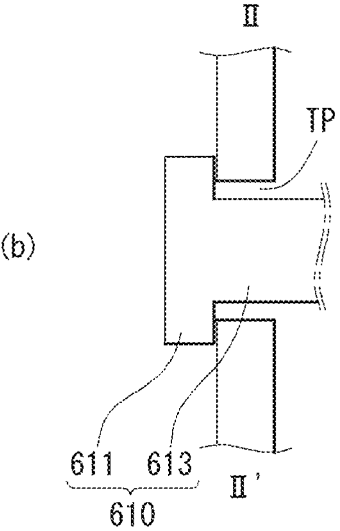

FIG. 12 is a diagram for describing the shape of the spacer according to an embodiment of the present disclosure. FIG. 13 to FIG. 15 are diagrams for describing the structures of the spacer and the tilting hole according to an embodiment of the present disclosure.

Referring to FIG. 12, the spacer 610 includes a spacer head 611 and a spacer neck 613. The spacer head 611 and the spacer neck 613 may have different cross-sectional areas in a plan view. For example, the spacer head 611 and the spacer neck 613 may have cylindrical shapes having different diameters. That is, the spacer head 611 has a cylindrical shape having a first diameter FRD, and the spacer neck 613 may have a cylindrical shape extending from the spacer head 611 and having a second diameter SRD less than the first diameter FRD. Since the spacer 610 includes the spacer head 611 and the spacer neck 613 having different diameters, the spacer 610 may be easily fastened to at least one side of the tilting hole 71 which will be described later.

Referring to FIG. 13 to FIG. 15, the frame 70 may include tilting holes 71. The tilting hole 71 includes an inlet portion IP and a guide portion TP. The guide portion TP may be located lower than the inlet portion IP. The guide portion TP may be located lower than the inlet portion IP in a load direction (or the gravity direction).

The inlet portion IP may be a portion into/from which the spacer 610 is inserted/released. That is, the inlet portion IP may have a sufficient hole area through which both the spacer head 611 and the spacer neck 613 can be inserted into the inlet portion IP and released therefrom. In other words, the inlet portion IP may have a larger hole area than the first diameter FRD of the spacer head 611. In other words, in the inlet portion IP, forward and backward movements of the spacer head 611 and the spacer neck 613 are not constrained. Although the inlet portion IP has a substantially circular shape in the figure, the present disclosure is not limited thereto. The inlet portion IP may have various planar figure shapes such as a rectangle, a square, and an oval.

The guide portion TP may include a seating part TP1 and first and second extension parts TP2 and TP3 extending from the seating part TP1 in one direction. The first extension part TP2 and the second extension part TP3 may extend in a reverse direction with respect to the seating part TP1. An extension line EL in the extension direction of the first and second extension parts TP2 and TP3 and a horizontal line HL in the horizontal direction intersect each other, and the angle θ therebetween is a tilting angle (dutch angle). The tilting angle means an inclined angle that is not vertical or horizontal. It may be desirable that an acute angle between the extension line EL and the horizontal line HL be 5°<θ<30°.

The guide portion TP may be a part to which the spacer 610 is fixed in the tilting hole 71. For example, the seating part TP1 may be a part where the spacer 610 moving along the shape of the tilting hole 71 in response to the movement of the display module 10 is first seated in the guide portion TP.

When a predetermined external force is provided, the display module 10 may be tilted in one direction and the spacer 610 may move along the shape of the guide portion TP in response thereto. The moving direction of the spacer 610 may be guided along the shape of the guide portion TP.

The guide portion TP has a hole area through which the spacer head 611 cannot be inserted into the guide portion TP and released therefrom. That is, the guide portion TP may have a smaller hole area than the first diameter FRD of the spacer head 611. Accordingly, forward movement of the spacer head 611 inserted toward the rear of the frame 70 through the inlet portion IP is restricted by the guide portion TP. Accordingly, the spacer 610 is not separated from the guide portion TP. The guide portion TP has a hole area through which the spacer neck 613 can pass. That is, the guide portion TP may have a larger hole area than the second diameter SRD of the spacer neck 613.

The tilting hole 71 may further include a link portion LP connecting the inlet portion IP and the guide portion TP. The link portion LP may serve as a moving path of the spacer 610 moving between the inlet portion IP and the guide portion TP. For example, the link portion LP may serve a moving path through which the spacer 610 inserted through the inlet portion IP moves to the guide portion TP such that the spacer 610 can be seated in the tilting hole 71. On the other hand, the link portion LP may serve as a moving path through which the spacer 610 seated on the guide portion TP moves to the inlet portion IP such that the spacer 610 can be separated from the tilting hole 71. Since the tilting hole 71 includes the link portion LP, a sufficient moving path of the spacer 610 may be secured. Accordingly, it is possible to prevent the spacer 610 seated on the guide portion TP from moving to the inlet portion IP by an unintentionally provided external force and thus being separated from the tilting hole 71.

Figure 17:
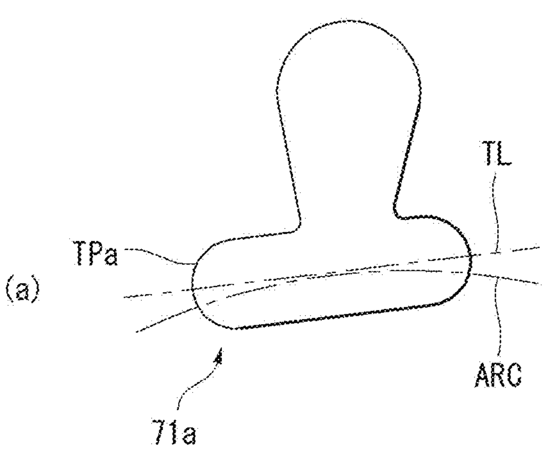
Figure 17:
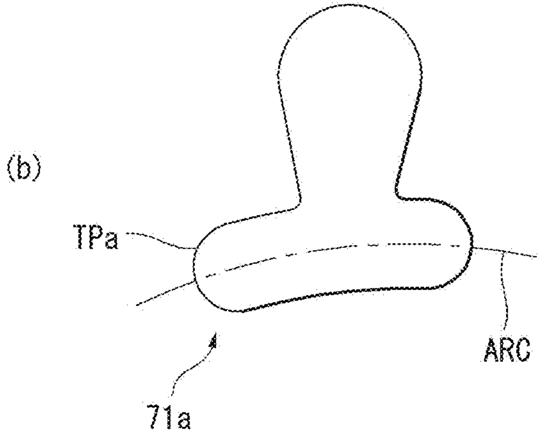
Figure 18:
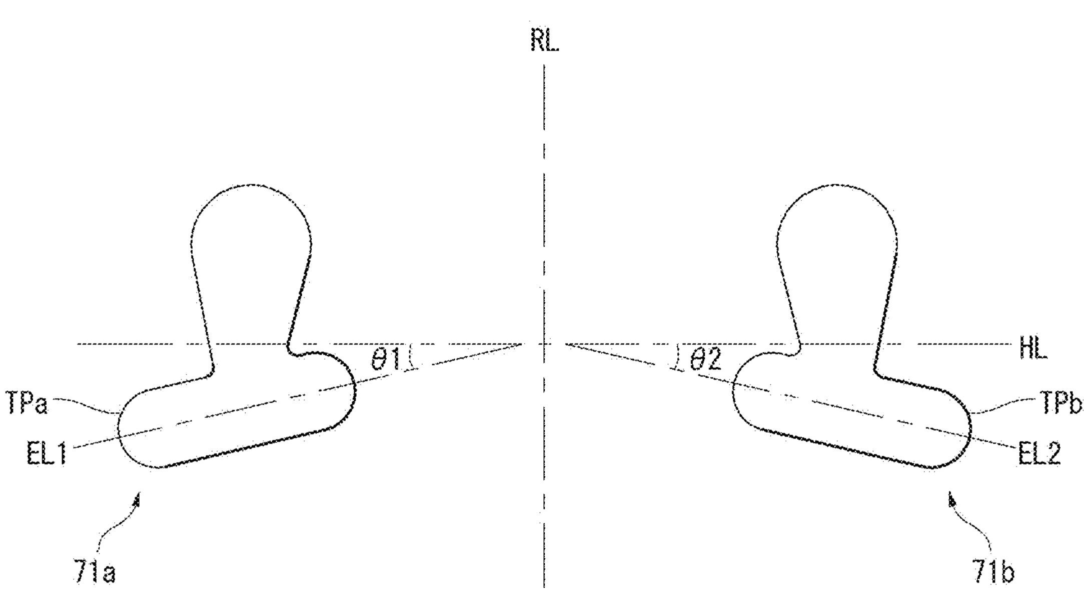

The link portion LP has a hole area through which the spacer head 611 cannot be inserted into the link portion LP and released therefrom. That is, the link portion LP may have a smaller hole area than the first diameter FRD of the spacer head 611. Accordingly, forward movement of the spacer head 611 inserted toward the rear of the frame part 70 through the inlet portion IP is restricted by the link portion LP. Accordingly, the spacer 610 is not separated from the link portion LP. The link portion LP may have a hole area through which the spacer neck 613 can pass. That is, the guide portion TP may have a larger hole area than the second diameter SRD of the spacer neck 613. The hole area of the link portion LP may be different from the hole area of the guide portion TP FIG. 16 to FIG. 18 are diagrams for describing the positional relationship and shape of a pair of spacers according to the present disclosure.

Figure 16:
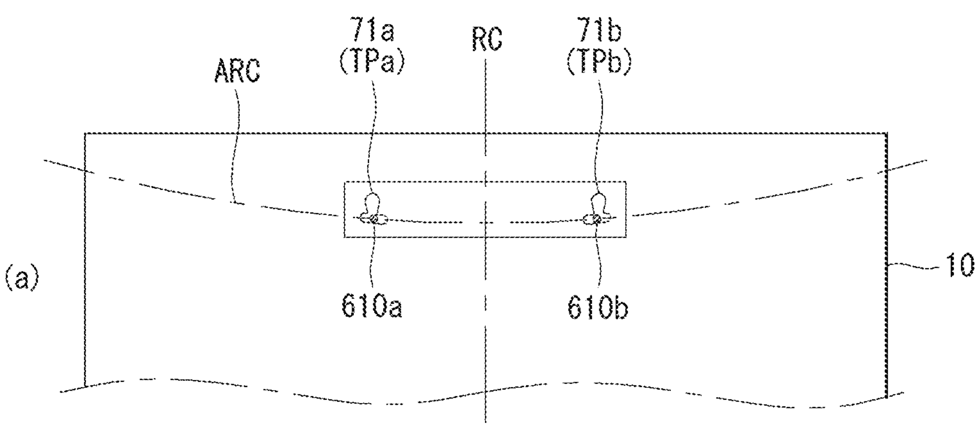
FIG. 16 to FIG. 18 are views for describing a positional relationship and shape of a pair of spacers according to the present disclosure.
Figure 16:
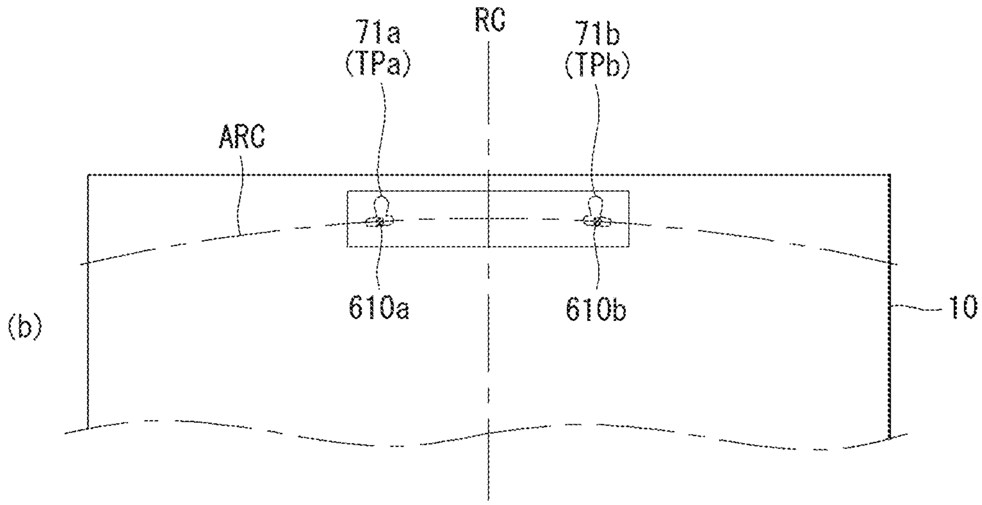

Referring to FIG. 16, the display module 10 includes at least a pair of the first spacer 610*a* and the second spacer 610*b*. At least a pair of the first tilting hole 71*a* and the second tilting hole 71*b* are provided in the frame 70 of the wall mount assembly 50.

The first spacer 610*a* may be provided at a position corresponding to the first tilting hole 71*a* and movably inserted into the first tilting hole 71*a*. The second spacer 610*b* may be provided at a position corresponding to the second tilting hole 71*b* and movably inserted into the second tilting hole 71*b*.

The display module 10 fastened to the frame 70 of the wall mount assembly 50 may be tilted in a preset direction. However, the current state (or fixed state) of the display module 10 coupled to the wall mount assembly 50 may be maintained until a predetermined external force is provided. The preset direction may be determined according to the positions and shapes of the first tilting hole 71*a* and the second tilting hole 71*b*. In particular, the preset direction may be determined according to the positions and shapes of the guide portion TP of the first tilting hole 71*a* (hereinafter referred to as a "first guide portion TPa") and the guide portion TP of the second tilting hole 71*b* (hereinafter referred to as a "second guide portion TPb").

The first guide portion TPa and the second guide portion TPb may be positioned on the line of a virtual arc ARC. The virtual arc ARC may mean a virtual curve connecting the center of the first guide portion TPa and the center of the second guide portion TPb. The virtual arc ARC may have a shape that is convexly curved downward (FIG. 16(*a*)) or convexly curved upward (FIG. 16(*b*)).

For example, the center of the first guide portion TPa and the center of the second guide portion TPb may be located on the line of the virtual arc ARC in areas corresponding to the left and right sides of the frame 70, respectively. The virtual arc ARC may be an arc that is a part of the circumference of a circle having a virtual center point. In this case, the virtual center point may be located on a reference line RL crossing the center of the frame 70 in the vertical direction. The curvature of the virtual arc ARC may vary depending on the position of the center point on the reference line RL.

The center of the first guide portion TPa positioned on the line of the virtual arc ARC may correspond to the center of the first spacer 610*a* fixed to the display module 10. In particular, the center of the first guide portion TPa positioned on the line of the virtual arc ARC may correspond to the center of the spacer neck 613 of the first spacer 610*a*. When the first spacer 610*a* has a cylindrical shape, the center of the first spacer 610*a* may be the center of a circle.

The center of the second guide portion TPb positioned on the line of the virtual arc ARC may correspond to the center of the second spacer 610*b* fixed to the display module 10. In particular, the center of the second guide portion TPb positioned on the line of the virtual arc ARC may correspond to the center of the spacer neck 613 of the second spacer 610*b*. When the second spacer 610*b* has a cylindrical shape, the center of the second spacer 610*b* may be the center of a circle.

Referring to (a) of FIG. 17, the extension direction of the first guide portion TPa may be a direction in which the tangent line TL of the virtual arc ARC passing through the centers of the first and second guide portions TPa and TPb extends. The extension direction of the second guide portion TPb forming a pair with the first guide portion TPa may be a direction in which the tangent line TL of the virtual arc ARC passing through the centers of the first and second guide portions TPa and TPb extends.

Referring to (b) of FIG. 17, the extension direction of the first guide portion TPa may be a direction in which the virtual arc ARC passing through the centers of the first and second guide portions TPa and TPb extends. The extension direction of the second guide portion TPb forming a pair with the first guide portion TPa may be a direction in which the virtual arc ARC passing through the centers of the first and second guide portions TPa and TPb extends. In this case, the first guide portion TPa and the second guide portion TPb have a curved shape.

Referring to FIG. 18, the first tilting hole 71*a* and the second tilting hole 71*b* may have symmetrical shapes. For example, the first tilting hole 71*a* and the second tilting hole 71*b* may be respectively located in areas corresponding to one side and the other side of the frame 70 such that they are line-symmetrical with respect to a virtual reference line RL. The virtual reference line RL may be a virtual straight line crossing the center of the frame 70 in the vertical direction. For example, a first angle θ1 formed between a first extension line EL1 extending in the extension direction of the first guide portion TPa and a horizontal line HL extending in the horizontal direction may be the same as a second angle θ2 formed between a second extension line EL2 extending in the extension direction of the second guide portion TPb and the horizontal line HL extending in the horizontal direction.

Figure 19:
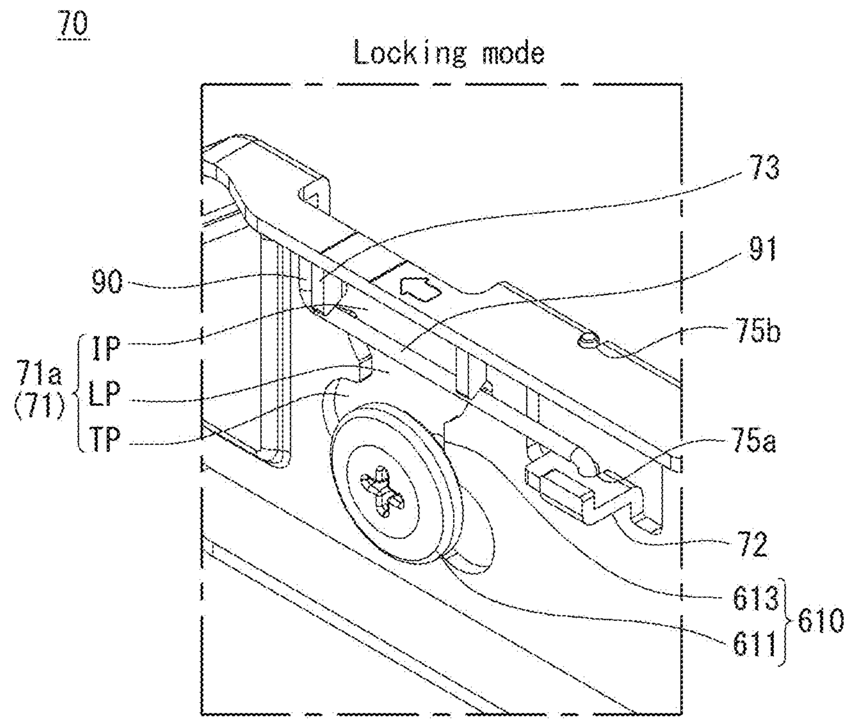
FIG. 19 to FIG. 21 are views for describing a locking part according to an embodiment of the present disclosure.
Figure 19:
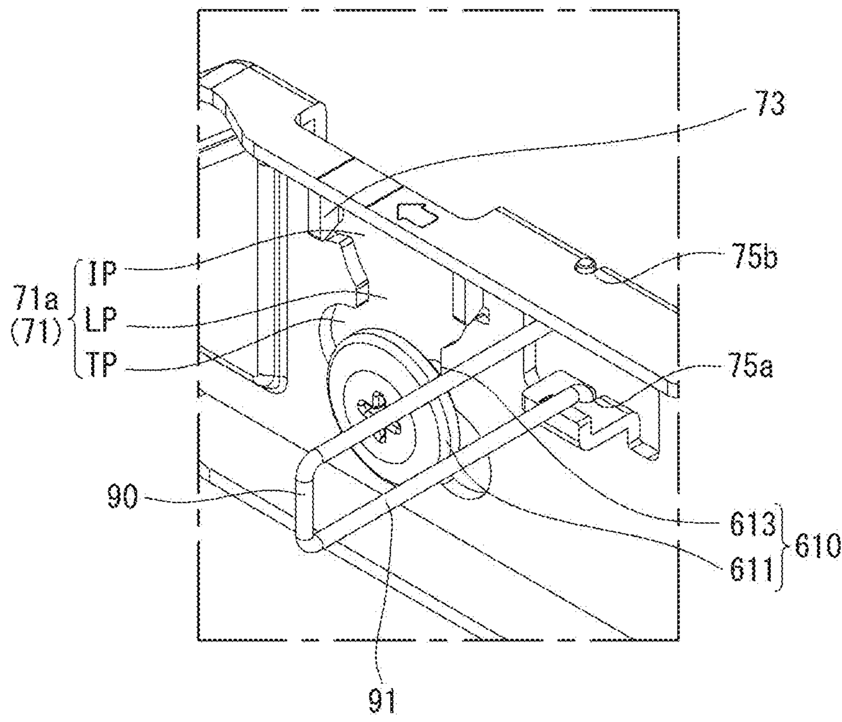
Figure 20:
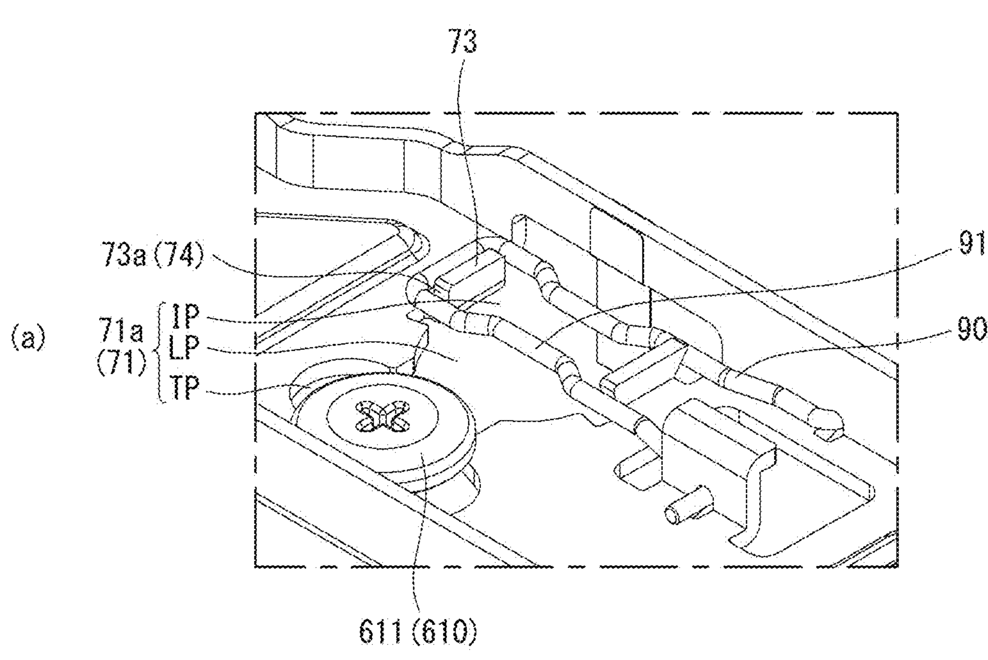
Figure 20:
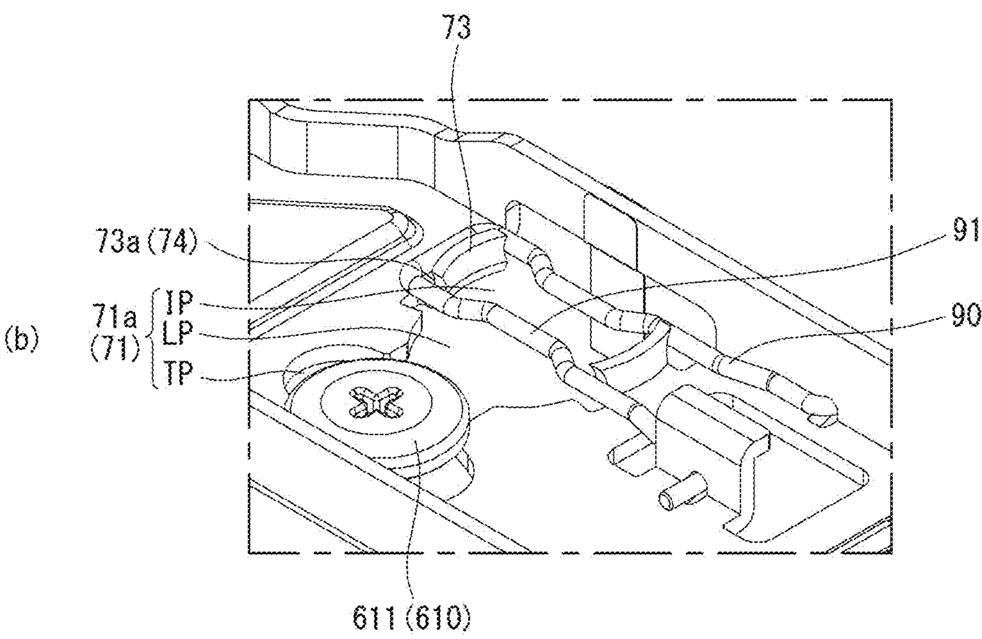
Figure 21:
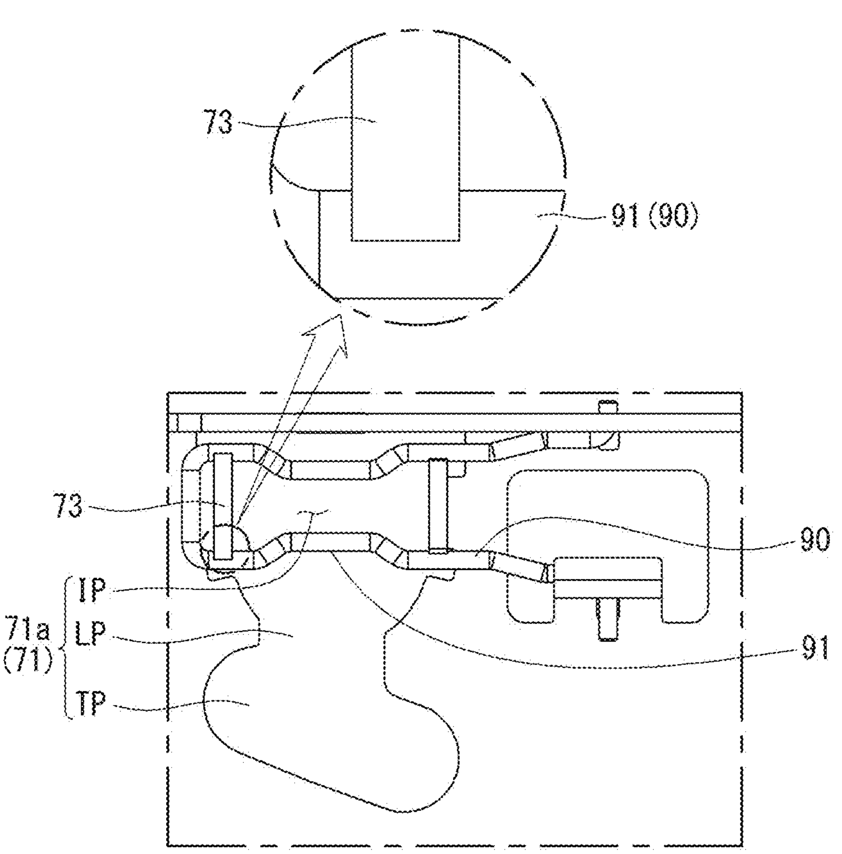

FIG. 19 to FIG. 21 are diagrams for describing a locking part according to an embodiment of the present disclosure.

Referring to FIG. 19 to FIG. 21, the frame 70 according to an embodiment of the present disclosure may include a locking part 90. The locking part 90 is fastened to the frame 70 and may serve to selectively limit the moving path of the spacer 610 inserted into the tilting hole 71. That is, the locking part 90 may serve to selectively open and close the moving path of the spacer 610 inserted into the tilting hole 71 according to user demand.

The locking part 90 is hinged to the frame 70 and may be provided rotatably with respect to the frame 70. The locking part 90 may be located at the rear of the frame 70. At least a portion of the locking part 90 may be positioned to overlap the tilting hole 71.

More specifically, at least a portion of the locking part 90 may be positioned to correspond to the area between the inlet portion IP and the guide portion TP of the tilting hole 71 and may selectively restrict a moving path of the spacer 610 moving between the inlet portion IP and the guide portion TP. For example, at least a portion of the locking part 90 may be positioned to correspond to the link portion LP of the tilting hole 71 and may selectively restrict the moving path of the spacer 610 moving from the guide portion TP to the inlet portion IP, but the present disclosure is not limited thereto. At least a portion of the locking part 90 blocking the moving path of the spacer 610 may be referred to as a blocking part 91.

The locking part 90 may have a rod shape elongated to have an approximately U-shape. The locking part 90 may have an open loop shape in which a part is opened. The locking part 90 may include at least one bent part or bending part but is not limited thereto.

One end and the other end of the locking part 90 may be rotatably coupled to the frame 70. For example, the frame 70 may include a first through-hole 75*a* and a second through-hole 75*b* that penetrate in the vertical direction. One end of the locking part 90 may be rotatably coupled to the first through-hole 75*a* with respect to a virtual axis extending in the vertical direction, and the other end of the locking part 90 may be rotatably coupled to the second through-hole 75*b* with respect to the virtual axis extending in the vertical direction. The through-hole 75 may be formed in a protrusion 72 protruding backward from the frame 70.

In a mode (or locking mode) in which the moving path of the spacer 610 is blocked, at least a portion of the locking part 90 may extend to cross the inlet portion IP to block the movement of the spacer 610 inserted into the guide portion TP to the inlet portion IP. In the locking mode, it is possible to prevent the spacer 610 inserted into the guide portion TP from being unintentionally moving to the inlet portion IP and being released from the tilting hole 71.

In a mode (or unlocking mode) in which the moving path of the spacer 610 is open, at least a portion of the locking part 90 may be spaced apart from the frame 70 backward such that the movement of the spacer 610 inserted into the guide portion TP is not blocked. That is, since the moving path of the spacer 610 is not limited by the locking part 90 in the unlocking mode, the spacer 610 inserted into the guide portion TP can move to the inlet portion IP and be released from the tilting hole 71.

The frame 70 may further include a stopper 73 for limiting the movement of the locking part 90 in the locking mode. The stopper 73 may have a shape protruding backward from the frame 70. The stopper 73 may be positioned around the tilting hole 71. The stopper 73 may be positioned around the inlet portion IP. The stopper 73 may extend from the periphery of the inlet portion IP along the shape of the inlet portion IP but is not limited thereto.

The lower surface 73*a* of the stopper 73 may be positioned to contact the blocking part 91. That is, in the locking mode, the blocking part 91 of the locking part 90 may be in contact with the lower surface 73*a* of the stopper 73 and the upward movement thereof may be restricted by the stopper 73. Accordingly, the movement of the spacer 610 can be restricted by the stopper 73 more effectively. That is, it is possible to effectively block the movement of the spacer 610 in the locking mode by further including the stopper 73.

For example, in the locking mode, at least a portion of the locking part 90 may be positioned to surround the outer periphery of the stopper 73.

The lower surface 73*a* of the stopper 73 may further include a trench 74. The trench 74 may have a shape partially recessed from the lower surface 73*a* of the stopper 73 upward. The lower surface 73*a* of the stopper 73 on which the trench 74 is formed may have an inclined shape ((a) of FIG. 20) or a rounded shape ((b) of FIG. 20), but is not limited thereto.

The blocking part 91 of the locking part 90 may be positioned to overlap one end of the stopper 73 corresponding to the lower surface 73*a* of the stopper 73. Accordingly, in the locking mode, at least a portion of the blocking part 91 of the locking part 90 can be accommodated in the internal space of the trench 74 and the backward movement thereof can be limited. That is, in the locking mode, the blocking part 91 of the locking part 90 may maintain a state in which it is accommodated in the internal space of the trench 74 unless an external force equal to or greater than a predetermined value is provided. Accordingly, it is possible to prevent the lock part 90 from being unintentionally released in the locking mode. On the other hand, in the unlocking mode, the user can release the blocking part 91 of the locking part 90 from the trench 74 by providing a predetermined force to the locking part 90. In such a structure, since the user can recognize whether the locking part 90 is seated in the trench 74 or released from the trench 74 by a click sound or fingertip sense and thus can easily ascertain locking or unlocking.

Figure 22:
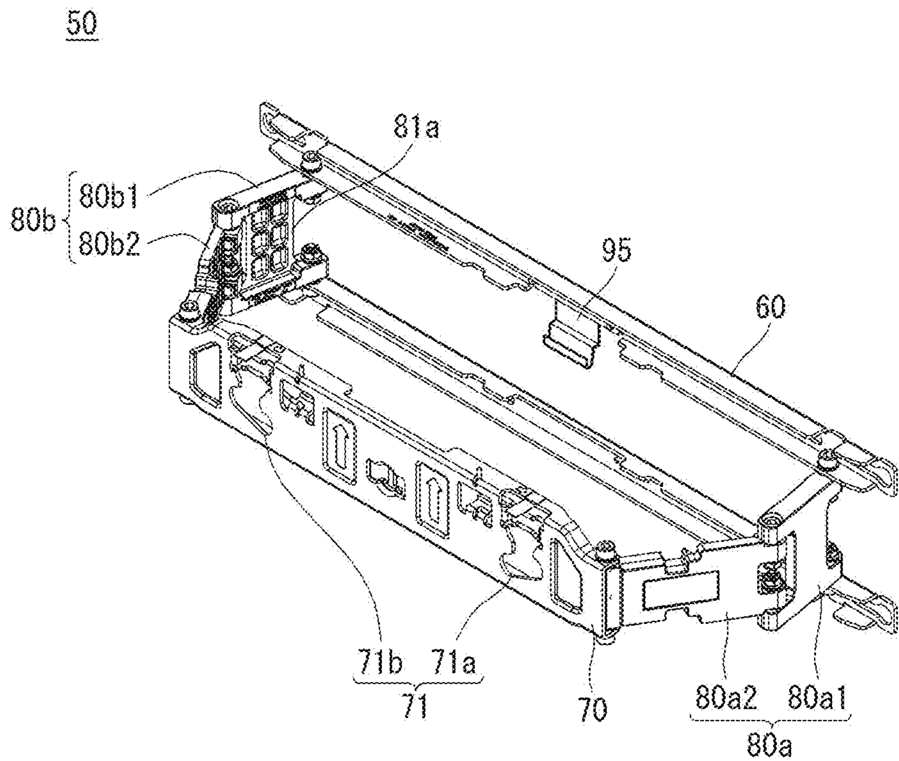
FIG. 22 and FIG. 23 are views for explaining an auxiliary locking part according to an embodiment of the present disclosure.
Figure 23:
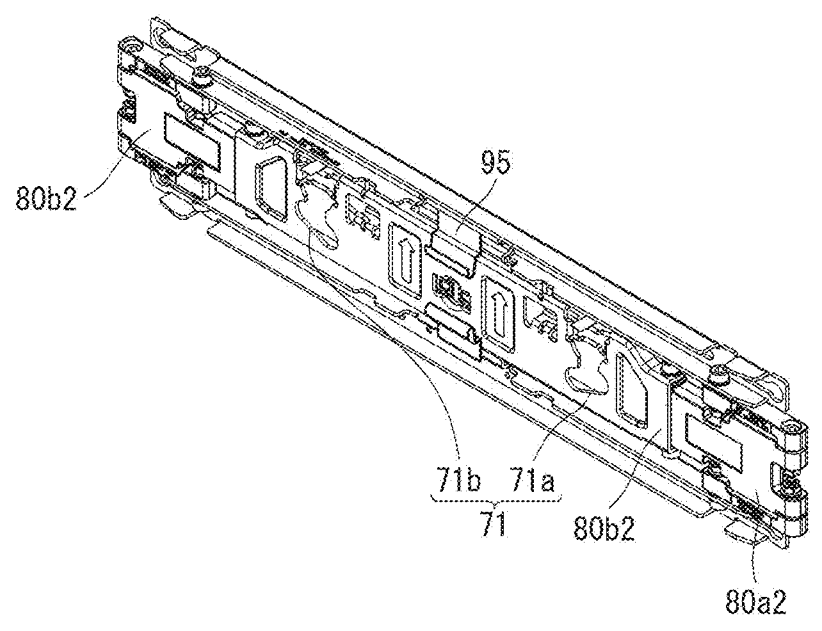

FIG. 22 and FIG. 23 are diagrams for describing an auxiliary locking part according to an embodiment of the present disclosure.

Referring to FIG. 22 and FIG. 23, the wall mount assembly according to an embodiment of the present disclosure may further include an auxiliary locking part 95. The auxiliary locking part 95 is fixed to the fixing part 60 and may serve to selectively limit the movement of the frame 70. The auxiliary locking part 95 may be an elastic member having predetermined elasticity. For example, the auxiliary locking part 95 may be a leaf spring, but is not limited thereto.

One end of the auxiliary locking part 95 may be fixed to the fixing part 60. The other end of the auxiliary locking part 95 may extend downward from one end of the auxiliary locking part 95 and may be positioned to overlap at least a part of the frame 70 in the back-and-forth direction.

In a state in which the display module 10 is in a position close to the fixed object 1000, the other end of the auxiliary locking part 95 may be positioned in front of the frame 70 such that the forward movement of the frame 70 is restricted. The state in which the display module 10 is in a position close to the fixed object 1000 may mean a state in which one surface of the (1-1)-th link **80*a*1 and the (1-2)-th link 80*a*2 constituting the first link part 80*a* are in contact with each other, one surface of the (2-1)-th link 80*b*1 and one surface of the (2-2)-th link 80*b*2 constituting the second link part 80*b* are in contact with each other. Alternatively, the state in which the display module 10 is in a position close to the fixed object 1000 may mean a state in which the translational motion and the swivel motion of the display module 10** are restricted.

On the other hand, in a state in which the display module 10 is spaced apart from the fixed object 1000, the other end of the auxiliary locking part 95 may be located at the rear of the frame 70 such that the forward movement of the frame 70 is not restricted. The state in which the display module 10 is spaced apart from the fixed object 1000 may mean a state in which one surface of the (1-1)-th link **80*a*1 and the (1-2)-th link 80*a*2 constituting the first link part 80*a* are spaced apart by a predetermined angle, and one surface of the (2-1)-th link 80*b*1 and one surface of the (2-2)-th link 80*b*2 constituting the second link portion 80*b* are spaced apart by a predetermined angle. Alternatively, the state in which the display module 10 is spaced apart from the fixed object 1000 may mean a state in which the translational motion and the swivel motion of the display module 10** are permitted.

Those skilled in the art will be able to change and modify the present disclosure in various manners through the above description without departing from the technical spirit of the present disclosure. Accordingly, the technical scope of the present disclosure should not be limited to the detailed description of the specification and should be defined by the claims.

What is claimed is:

1. A display device comprising:

a display module including a display panel;

first and second spacers disposed at the rear of the display module and fixed to the display module; and a wall mount assembly disposed at the rear of a back cover and fastened to the first and second spacers while allowing movements of the first and second spacers, wherein the wall mount assembly includes:

a fixing part fixed to a fixed object;

a frame having first and second tilting holes into which the first and second spacers are respectively inserted, and which guides moving paths of the first and second spacers, and a locking part for selectively restricting the moving paths of the first and second spacers inserted into the first and second tilting holes; and a link connecting the fixing part and the frame to each other, wherein each of the first and second tilting holes includes:

an inlet portion provided to allow the first and second spacers to be inserted into and released from the inlet portion;

a guide portion disposed under the inlet portion, in which the first and second spacers inserted through the inlet portion is seated; and a link portion connecting the inlet portion and the guide portion, wherein the locking part includes a blocking part rotatably fastened to the frame and disposed between the inlet portion and the guide portion, wherein the blocking part is disposed to correspond to the link portion, and wherein the display module is maintained in one of a translational state, a swivel state, and a tilting state depending on the position of the first and second spacers with respect to the tilting hole.

2. The display device of claim 1, wherein one end and the other end of the locking part are rotatably fastened to the frame.

3. The display device of claim 1, wherein each of the first and second spacers includes:

a spacer head having a first diameter; and a spacer neck extending from the spacer head and having a second diameter less than the first diameter, wherein the inlet portion has a hole area greater than the first diameter, and wherein the guide portion has a hole area less than the first diameter and greater than the second diameter.

4. The display device of claim 3, wherein the guide portion includes:

a seating part; and first and second extension parts extending from the seating part in one direction, and wherein the first and second extension parts extend in a reverse direction from the seating part.

5. The display device of claim 4, wherein an extension line extending in the extension direction of the guide portion and a horizontal line extending in a horizontal direction intersect each other, and an angle formed by the extension line and the horizontal line is a tilt angle.

6. The display device of claim 4, wherein the guide portions of the first and second tilting holes extend in a straight line form in a tangent direction of a virtual arc passing through centers of the guide portions of the first and second tilting holes or extend in a curved form in an extension direction of the virtual arc.

7. The display device of claim 6, wherein the virtual arc is convexly curved upward or convexly curved downward.

8. The display device of claim 6, wherein the virtual arc is a part of the circumference of a circle having a virtual center point, and wherein the virtual center point is positioned on a reference line crossing the center of the frame in the vertical direction.

9. The display device of claim 1, wherein the first and second tilting holes are symmetrical with respect to a reference line crossing the center of the frame in the vertical direction.

10. The display device of claim 1, further comprising an auxiliary locking part fixed to the fixing part through one end and having predetermined elasticity, wherein the other end of the auxiliary locking part extends downward from one end of the auxiliary locking part and is disposed to overlap at least a part of the frame in a back-and-forth direction.

11. The display device of claim 1, wherein the display module includes:

a module cover disposed at the rear of the display panel;

the back cover disposed at the rear of the module cover and having first and second open holes disposed to correspond to the first and second spacers; and a wall mount plate disposed between the module cover and the back cover and fixed to the module cover, and wherein the first and second spacers are fixed to the wall mount plate through the first and second open holes, respectively, at the rear of the back cover.

12. The display device of claim 11, wherein the back cover includes a forming part overlapping the wall mount plate, and at least a part of the wall mount assembly is inserted into the forming part.

13. The display device of claim 1, wherein the link includes a first link and a second link rotatably coupled to each other based on a virtual first axis extending in the vertical direction, and wherein one end of the first link is rotatably coupled to the fixing part based on a virtual second axis extending in the vertical direction, and one end of the second link is rotatably coupled to the frame based on a virtual third axis extending in the vertical direction.

14. The display device of claim 13, wherein the first link includes an accommodating recess capable of accommodating at least a part of the second link.

* * * * *